United States Patent
Hoshina et al.

(10) Patent No.: US 10,110,842 B2
(45) Date of Patent: Oct. 23, 2018

(54) IMAGE CAPTURING APPARATUS, CONTROL METHOD THEREOF AND STORAGE MEDIUM

(71) Applicant: CANON KABUSHIKI KAISHA, Tokyo (JP)

(72) Inventors: Takayuki Hoshina, Yokohama (JP); Hiroaki Onodera, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/657,428

(22) Filed: Jul. 24, 2017

(65) Prior Publication Data
US 2018/0035064 A1 Feb. 1, 2018

(30) Foreign Application Priority Data
Jul. 28, 2016 (JP) ................................. 2016-148993

(51) Int. Cl.
*G03B 13/00* (2006.01)
*H04N 5/232* (2006.01)
(Continued)

(52) U.S. Cl.
CPC ......... *H04N 5/378* (2013.01); *H04N 5/23245* (2013.01); *H04N 5/3765* (2013.01)

(58) Field of Classification Search
CPC ...... G01R 29/26; H04N 5/217; H04N 5/2173; H04N 5/357; H04N 5/3572; H04N 5/3575; H04N 5/3577; H04N 5/363; H04N 5/365; H04N 5/3651; H04N 5/3653; H04N 5/3655; H04N 5/3656; H04N 5/3658; H04N 3/1568; H04N 1/409; H04N 1/58;
(Continued)

(56) References Cited

U.S. PATENT DOCUMENTS 6,124,888 A * 9/2000 Terada .................... H04N 9/045
    348/302
6,597,399 B2 * 7/2003 Horii ..................... H04N 5/3454
    250/208.1
(Continued)

FOREIGN PATENT DOCUMENTS

JP    2001-124984 A    5/2001
JP    2008-219292 A    9/2008
JP    2010-056795 A    3/2010

*Primary Examiner* — Chia-Wei A Chen
(74) *Attorney, Agent, or Firm* — Cowan, Liebowitz & Latman, P.C.

(57) ABSTRACT

An image capturing apparatus has an image sensor in which unit pixels each having a plurality of photoelectric conversion portions are arranged in matrix, a readout unit for performing a first readout operation of reading out signals of a portion of the plurality of photoelectric conversion portions and a second readout operation of reading out signals of a greater number of the plurality of photoelectric conversion portions, a switching regulator, and a frequency controller for controlling a switching frequency of the switching regulator. The frequency controller controls the switching frequency such that the phase of the switching frequency satisfies predetermined relationship, with respect to a timing for reading out noise signals, a timing for reading out signals by the first readout operation, and a timing for reading out signals by the second readout operation.

13 Claims, 26 Drawing Sheets

(51) Int. Cl.
*H04N 3/14* (2006.01)
*H04N 5/335* (2011.01)
*H04N 9/64* (2006.01)
*H04N 5/378* (2011.01)
*H04N 5/376* (2011.01)

(58) Field of Classification Search
CPC ...... H04N 5/3765; H04N 5/0733; G06K 9/40; G06T 2207/20182; G06T 5/002; H03M 3/342; G06F 1/08; G06F 1/12; G06F 1/04; G06F 1/06; G06F 1/10; G06F 1/105; G06F 1/14
See application file for complete search history.

(56) References Cited

U.S. PATENT DOCUMENTS

| | | | |
|---|---|---|---|
| 2002/0100921 A1* | 8/2002 | Mabuchi | H01L 27/14621 257/222 |
| 2005/0062864 A1* | 3/2005 | Mabuchi | H04N 3/155 348/294 |
| 2009/0114919 A1* | 5/2009 | Kawahito | G01C 3/02 257/59 |
| 2010/0097501 A1* | 4/2010 | Fowler | H04N 5/361 348/241 |
| 2010/0157077 A1* | 6/2010 | Shiraishi | H04N 5/232 348/222.1 |
| 2010/0194949 A1* | 8/2010 | Hisamatsu | H03K 23/62 348/302 |
| 2011/0043669 A1* | 2/2011 | Ishida | H04N 5/23238 348/264 |
| 2011/0063689 A1* | 3/2011 | Yoshigae | H04N 5/243 358/445 |
| 2012/0320246 A1* | 12/2012 | Ikuma | H04N 5/3575 348/300 |
| 2014/0252208 A1* | 9/2014 | Fujinaka | H04N 5/363 250/208.1 |
| 2017/0077943 A1* | 3/2017 | Saint Martin | H03M 1/0634 |
| 2017/0163914 A1* | 6/2017 | Hara | H04N 5/3537 |
| 2018/0077366 A1* | 3/2018 | Nishihara | H04N 5/378 |

* cited by examiner

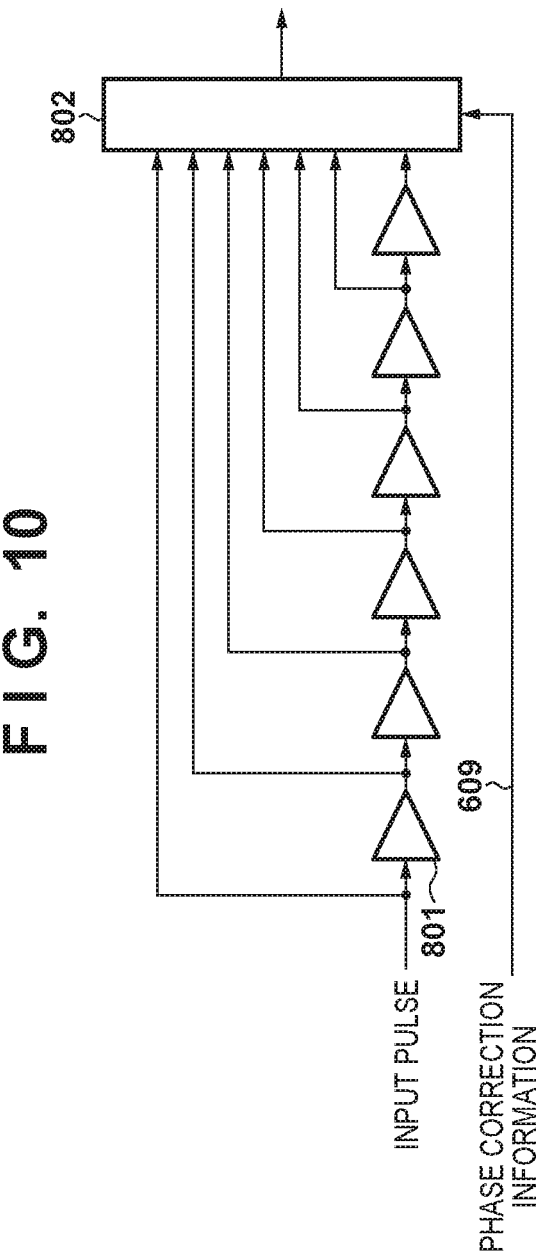

F I G. 14
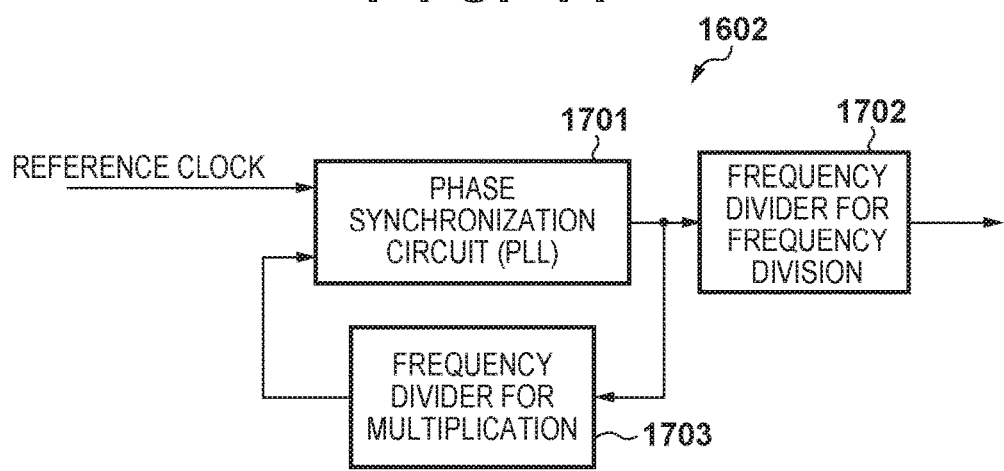
F I G. 15
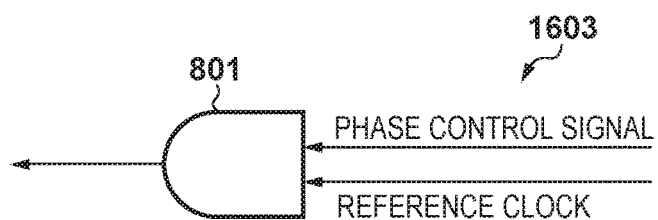

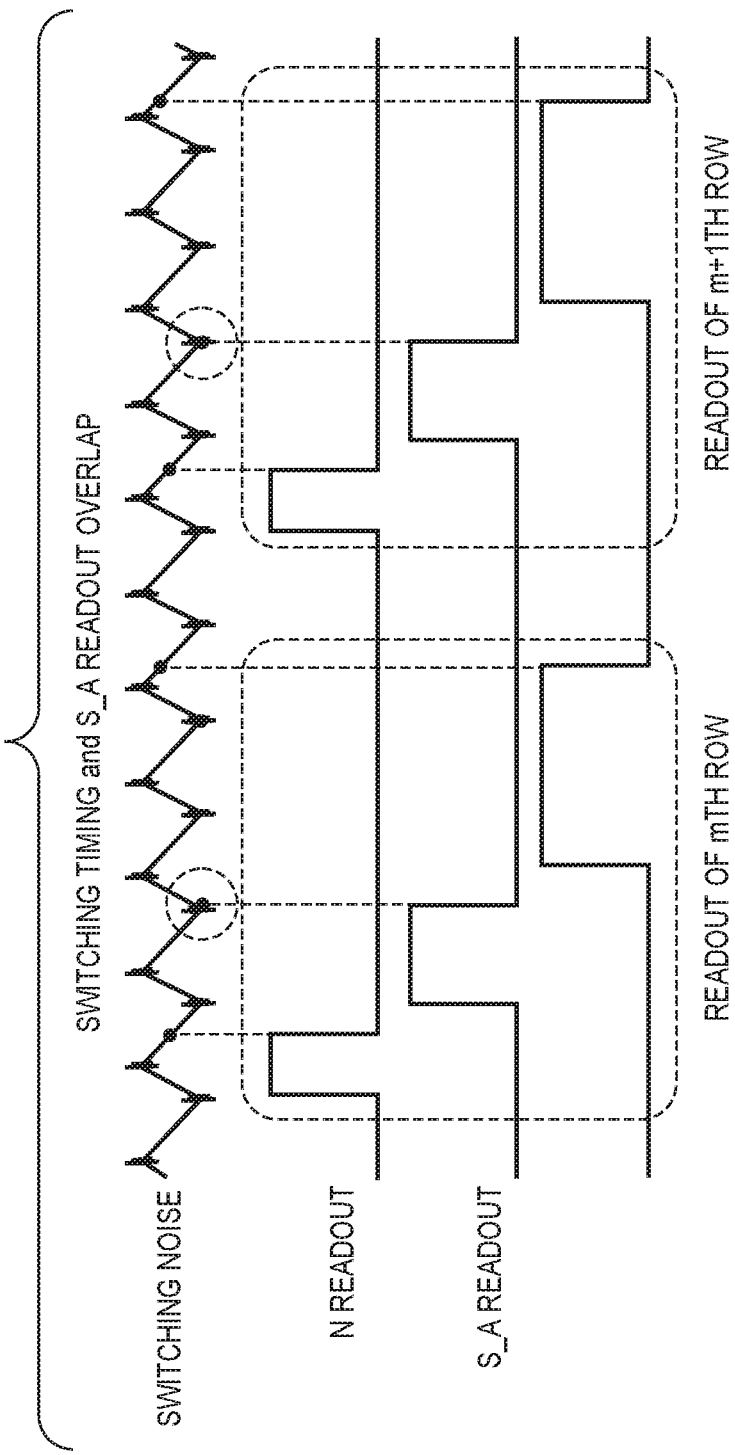

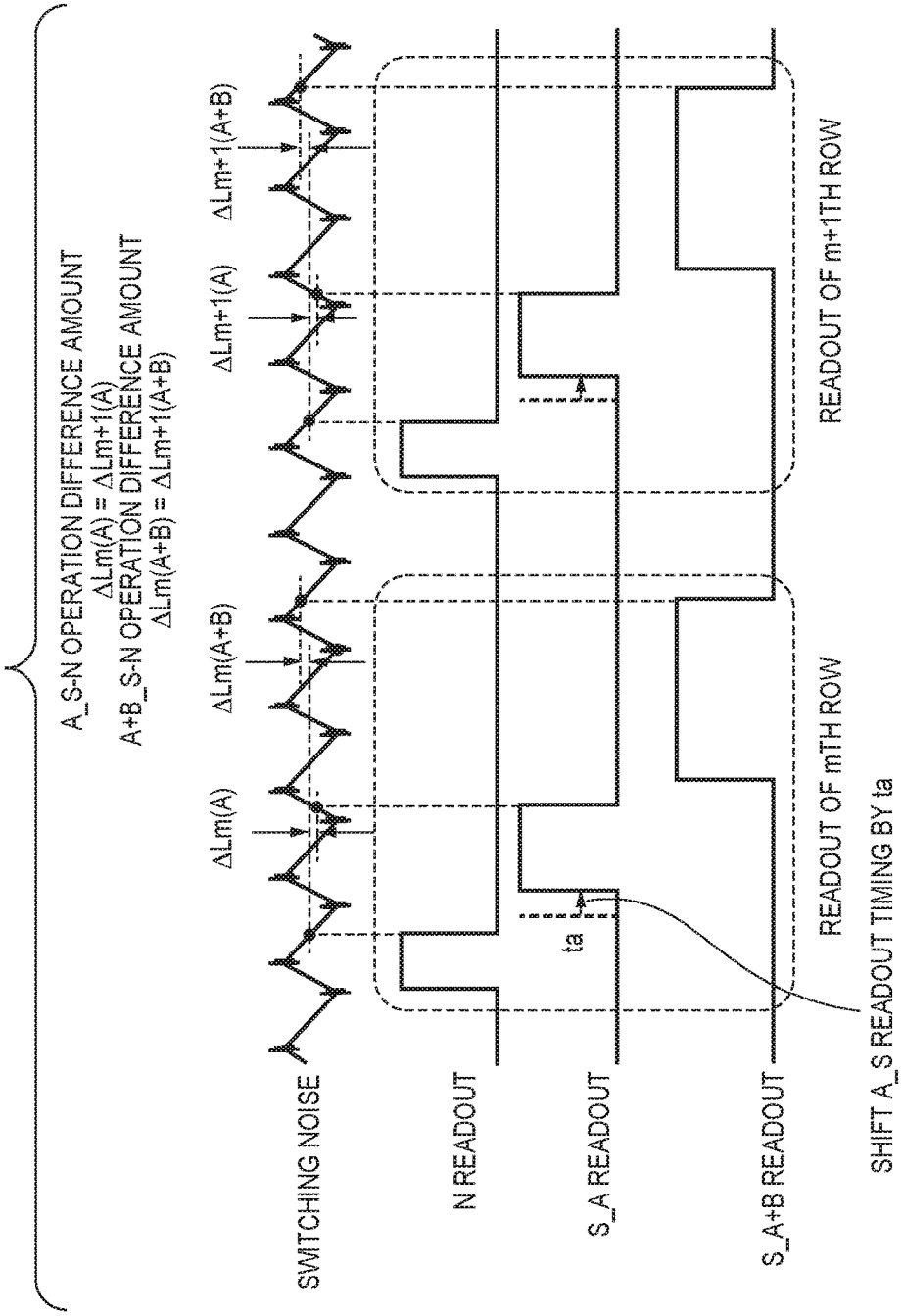

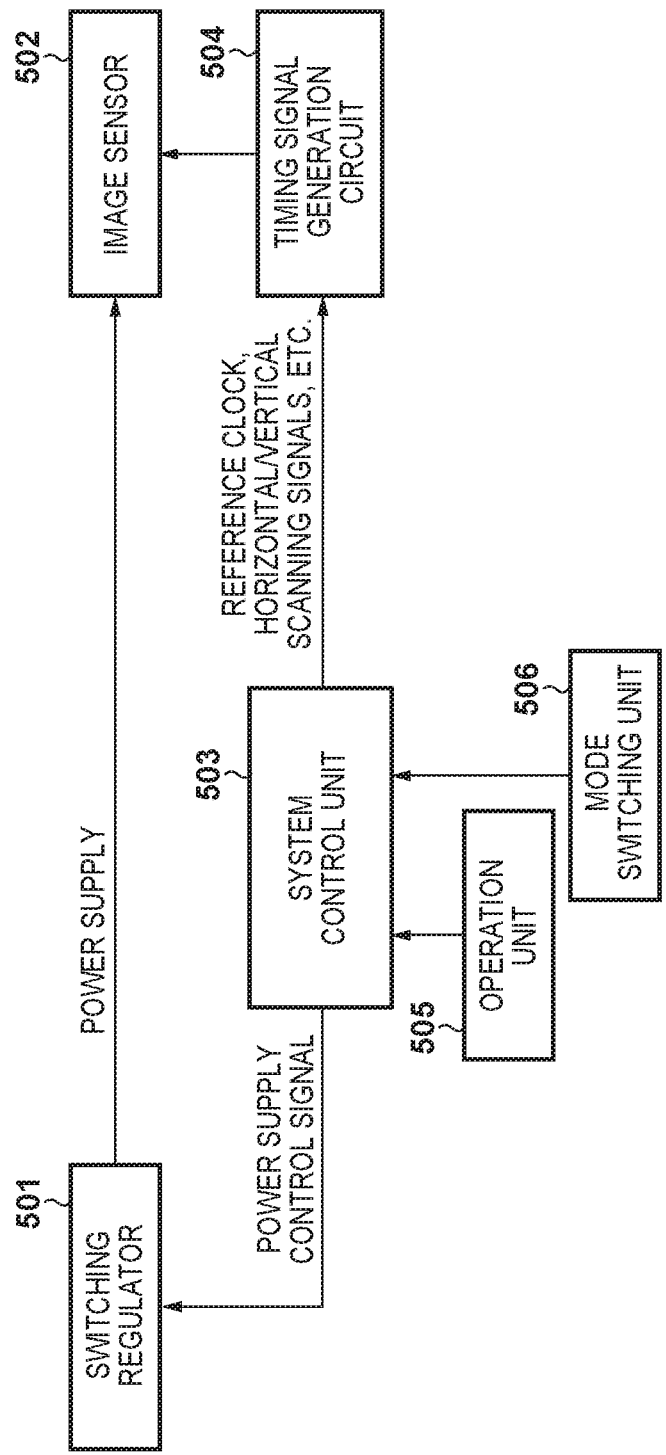

IMAGE CAPTURING APPARATUS, CONTROL METHOD THEREOF AND STORAGE MEDIUM

BACKGROUND OF THE INVENTION

Field of the Invention

The present invention relates to an image capturing apparatus and a control method thereof.

Description of the Related Art

Generally, in image capturing apparatuses such as digital cameras and digital video cameras, a CCD or CMOS image sensor (hereinafter, a CMOS sensor) is used as an image sensor.

Here, an image capturing operation in a conventional and general image capturing apparatus will be described. FIG. 21 is a diagram showing a portion of the configuration of a conventional image capturing apparatus. In FIG. 21, in the image capturing apparatus, when a power switch (not illustrated) is turned on, a switching regulator 501 of a power supply unit is activated, and supplies power to the blocks. When a release button that is one constituent element of an operation unit 505 or the like is half-pressed by the user, operations for preparing for shooting such as autofocus and exposure setting are started. When the release button is further pressed and enters a fully pressed state, a system control unit 503 controls constituent elements of the image capturing system such as a timing signal generation circuit 504 and an image sensor 502, and a shooting operation is started.

FIG. 22 is a diagram showing an equivalent circuit of a pixel unit of a CMOS sensor. As shown in FIG. 22, an optical carrier generated in a photodiode (hereinafter, a PD) 401 accumulates in a gate electrode (a floating diffusion portion: a FD 411) of a MOS transistor. The potential change of the optical carrier is then amplified according to a drive timing signal from a scanning circuit, and the amplified potential change is output as a pixel signal.

If the CMOS sensor that has the equivalent circuit of the pixel unit as shown in FIG. 22 is driven, accumulation of photo charges in the PD 401 ends after a time T2 has elapsed as indicated by the timing chart in FIG. 23. Subsequently, a control signal φSEL becomes active, and a row selection switch (hereinafter, TSEL) 406 is turned on, and thereby the source followers (hereinafter, SFs) 410 of all the pixels in an n-th row enter an operation state. Regarding the FD 411, which is the gate of the SF 410 constituted by a pixel amplifier, a control signal φRES becomes active during the period of a time T3, a reset switch (hereinafter, a TRES) 403 is turned on, and the FD 411, which is the gate of the SF 410, is reset. At this time, a dark level signal is output to a column output line 412, a transfer gate 413b is turned on, and the dark level signal output is held in a signal accumulation unit 414. A period obtained by combining this time T3 and a time T4 is referred to as an "N readout" (noise component readout) period.

Next, after "N readout" for transferring the dark level signal to the signal accumulation unit 414 is complete, the electric charges accumulated in the PD 401 are transferred to the FD 411 that is the gate of the SF 410, by setting a control signal φTX to active and turning a transfer switch 402 to an on state for the period of a time T5. Here, a control signal φTS becomes active for the period of a time T6, and a transfer gate 413a is turned on, and thereby the signals accumulated in the PD 401 are held in the signal accumulation unit 414. This period for which signal output at a pixel signal level is held is referred to as an "S readout" period. By performing an operation of calculating the difference between this signal level and the dark level (hereinafter, an "S–N operation"), it becomes possible to avoid the influence of fixed pattern noise due to manufacturing variation and the like, and obtain an image with high S/N in normal object shooting.

However, as indicated by the timing chart of the image sensor in FIG. 23, "N readout" and "S readout" operations are not performed at the same time. Therefore, the influence of switching noise that occurs when the switching regulator 501 of the power supply unit operates, magnetic field noise that occurs from a coil constituting the switching regulator 501 and the like is superimposed during "N readout" and "S readout". As a result, when the "S–N operation" is performed, the difference amount of potential levels differs for each row, which becomes offset noise, and S/N deteriorates. FIG. 24 shows a state in which the difference amount of potential levels differs for each row during "N readout" and "S readout".

In order to address such a problem, there is a technique for reducing horizontal stripes using a difference detection means by uniformizing the difference amount of noise at the time of "N readout" and "S readout" for each row. For example, as suggested in Japanese Patent Laid-Open No. 2008-219292, a method for selecting an appropriate frequency from a plurality of switching frequencies of the switching regulator that have been prepared according to the operation mode so as to change the frequency is conceivable. Also as suggested in Japanese Patent Laid-Open No. 2010-056795, there is a method for detecting the cycle of noise that occurs from the switching regulator, and changing the readout cycle of the image sensor in accordance with the cycle of noise.

In addition, multi-functionality of an image sensor used in image capturing apparatuses such as digital still cameras and digital video cameras has been advancing, and for example, image sensors that have a phase difference focus detection function are also known. Specifically, by adopting a configuration in which one pixel of the image sensor is provided with two photodiodes and one microlens, and each of the photodiodes receives light that has passed through a different pupil region of the photographing lens, phase difference focus detection in which output signals of the photodiodes are used becomes possible. Moreover, image output can be obtained by adding together the output signals of the two photodiodes provided in the same pixel (Japanese Patent Laid-Open No. 2001-124984).

However, a method in which the frequency is selective as in Japanese Patent Laid-Open No. 2008-219292 cannot be applied to a device whose frequency has shifted from a desired frequency due to the surrounding environment and variation of constituent elements, and thus there are cases where an optimum switching frequency is not obtained even if the frequency is changed.

If the readout cycle is changed according to noise as in Japanese Patent Laid-Open No. 2010-056795, the readout cycle is restricted depending on the frequency of the noise. Furthermore, steep power supply voltage variation occurs at a switching timing of the switching regulator. If the image sensor carries out a readout operation such as "N readout" or "S readout" at this switching timing, the difference amount cannot be kept constant, and thus there is a possibility that S/N deteriorates.

Moreover, with the configuration of Japanese Patent Laid-Open No. 2001-124984, it is necessary to obtain signals from two photodiodes per pixel. Therefore, compared with a conventional configuration in which there is one photodiode for one pixel, the number of timings of "S readout" for each row is doubled. With the number of timings of "S readout" being doubled, when the frequency is only adjusted to the "N readout" timing and one of the "S readout" timings, the difference amount of noise during the "N readout" timing and the two "S readout" timings differs for each row, and there are cases where the accuracy of readout signals deteriorates, and horizontal stripes appear is the image.

SUMMARY OF THE INVENTION

The present invention has been made in light of the above-described issue, and provides an image capturing apparatus that can more effectively reduce image noise caused by a switching regulator.

According to a first aspect of the present invention, there is provided an image capturing apparatus comprising: an image sensor in which unit pixels each having a plurality of photoelectric conversion portions are arranged in matrix; a readout unit that performs a first readout operation of reading out signals of a portion of the plurality of photoelectric conversion portions of the unit pixel and a second readout operation of reading out signals of a greater number of the plurality of photoelectric conversion portions of the unit pixel than the first readout operation; a switching regulator that drive the readout unit; and a frequency controller that controls a switching frequency of the switching regulator, wherein the frequency controller controls a switching frequency of the switching regulator such that a phase of the switching frequency satisfies predetermined relationship, with respect to a timing for reading out noise signals from the plurality of photoelectric conversion portions using the readout unit, a timing for reading out signals from the plurality of photoelectric conversion portions by the first readout operation, and a timing for reading out signals from the plurality of photoelectric conversion portions by the second readout operation.

According to a second aspect of the present invention, there is provided a control method for an image capturing apparatus that has an image sensor in which unit pixels each having a plurality of photoelectric conversion portions are arranged in matrix, a readout unit that performs a first readout operation of reading out signals of a portion of the plurality of photoelectric conversion portions of the unit pixel and a second readout operation of reading out signals of a greater number of the plurality of photoelectric conversion portions of the unit pixel than the first readout operation, and a switching regulator that drives the readout unit, the method comprising: performing frequency control for controlling a switching frequency of the switching regulator, wherein in the frequency control, a switching frequency of the switching regulator is controlled such that a phase of the switching frequency satisfies predetermined relationship, with respect to a timing for reading out noise signals from the plurality of photoelectric conversion portions using the readout unit, a timing for reading out signals from the plurality of photoelectric conversion portions by the first readout operation, and a timing for reading out signals from the plurality of photoelectric conversion portions by the second readout operation.

Further features of the present invention will become apparent from the following description of exemplary embodiments with reference to the attached drawings.

BRIEF DESCRIPTION OF THE DRAWINGS

FIG. 10 is a diagram showing the configuration of a phase correction unit in the first embodiment.

FIG. 14 is a diagram showing the configuration of a frequency control unit in the second embodiment.

FIG. 15 is a diagram showing the configuration of a phase control unit in the second embodiment.

FIGS. 20A and 20B are diagrams showing the phase relationship between readout timing and switching timing of a switching regulator in the third embodiment.

FIG. 21 is a diagram showing the configuration of a conventional image capturing apparatus.

DESCRIPTION OF THE EMBODIMENTS

Embodiments of the present invention will be described in detail below with reference to the attached drawings.

First Embodiment

Figure 1:
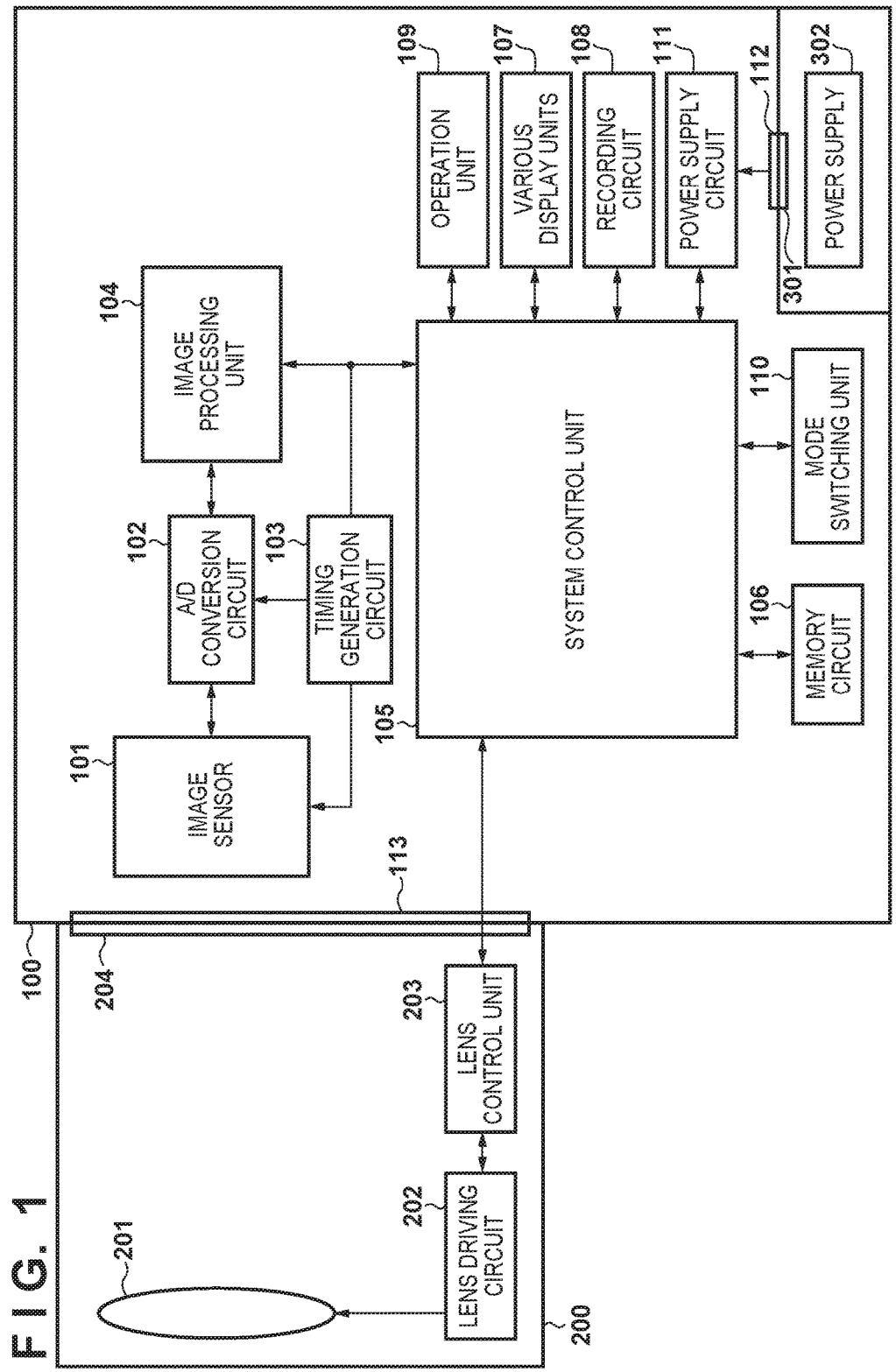
FIG. 1 is a block diagram showing the configuration of an image capturing apparatus according to a first embodiment of the present invention.

FIG. 1 is a block diagram showing a main portion of an image capturing system that is a first embodiment of an image capturing apparatus of the present invention. In FIG. 1, the image capturing system is constituted by an interchangeable-lens digital single-lens reflex camera, for example, and has a camera body 100 and a lens unit 200 that guides incident light to an image sensor.

Figure 3:
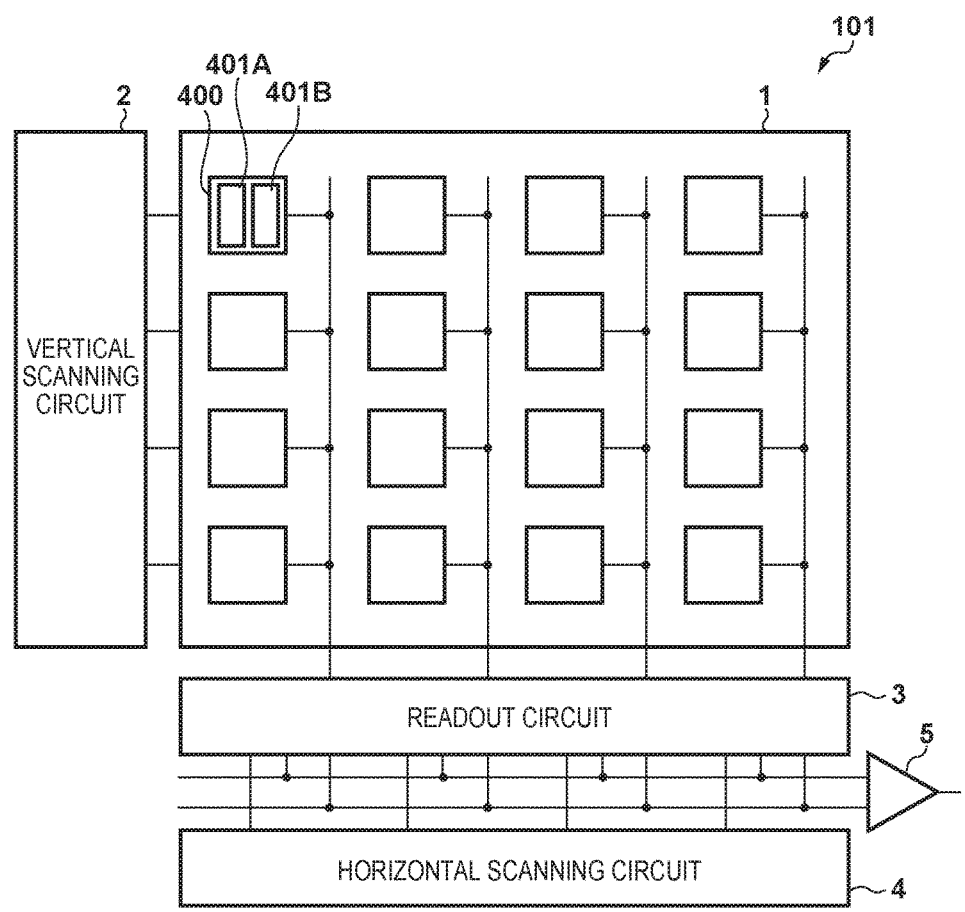
FIG. 3 is a diagram showing the configuration of an image sensor.

First, the configuration of the camera body 100 will be described in an image sensor 101, a plurality of unit pixels 400 shown in FIG. 3 are arranged in matrix, an image of the subject formed in the image sensor 101 is converted, into electrical image signals, and the electrical image signals are output from the image sensor 101. An image processing unit 104 performs predetermined calculation processing on video signals output from the image sensor 101. Image processing such as pixel interpolation processing, color conversion processing and white balance processing is then performed on the obtained video signals, and the processed video signals are output to various display units 107 via a system control unit 105. In addition, the image processing unit 104 has an image compression function such as JPEG. The image processing unit 104 further generates a B image signal from two pieces of information, namely, an A image signal and an A+B image signal obtained from the image sensor 101. This operation will be described later.

An A/D conversion circuit 102 converts, into digital signals, analog signals obtained by the image sensor 101 performing photoelectric conversion, and outputting. A timing generation circuit 103 receives, from the image processing unit 104, a reference clock signal and a control signal for driving the image capturing system, and supplies, to the image sensor 101 and the A/D conversion circuit 102, timing signals that define operation timings of these constituent elements, such as a clock signal and a control signal.

The system control unit 105 performs various types of calculation, and controls overall operations of the image capturing apparatus including the image sensor 101. The system control unit 105 further uses information regarding two light beams of an A image signal and a B image signal that are output from the image processing unit 104, to perform a phase difference focus detection operation.

A memory circuit 106 also includes an electrically erasable and recordable non-volatile memory, and stores setting values such as various parameters and ISO sensitivity, shooting modes, various types of correction data and the like. The various display units 107 include a liquid crystal apparatus that displays operational states messages and the like with characters, images, sounds and the like, according to the system control unit 105 executing a program, and a speaker and the like, and are constituted by a combination of an LCD, an LED, a sound generating element and the like. In addition, a portion of the various display units 107 is also provided in an optical finder or the like.

A recording circuit 108 is a circuit that reads from/writes to a removable recording medium such as a semiconductor memory for recording or reading out image data. An operation unit 109 is an operation means for inputting various operation instructions to the system control unit 105. Such operation means include one of or combination of a switch, a dial, a touch panel, a pointing device employing line-of-sight detection, a sound recognition device and the like.

A mode switching unit 110 is a switch for switching and setting various shooting modes such as still image shooting, live view shooting and moving image shooting. A power supply circuit 111 is constituted by a battery detection unit, an electric current detection unit, a protection circuit, a DC-DC converter, an LDO regulator and the like. Also, the power supply circuit 111 has a function for detecting whether or not a battery is mounted, functions for detecting a battery type and a residual amount, a function for protecting a load circuit connected to the power supply circuit by shutting off the power supply when overcurrent is detected, and the like. Also, based on an instruction of the system control unit 105, the power supply circuit 111 controls the DC-DC converter so as to supply a desired power supply voltage to constituent elements of the camera body 100 for a desired period. Connectors 112 and 301 connect a power supply 302 and the camera body 100. The power supply 302 is constituted by a primary battery such as an alkaline battery or a lithium battery, a secondary battery such as a NiCd battery, a NiMH battery or a Li battery, an AC adaptor and the like.

Next, the configuration of the lens unit 200 will be described.

The image capturing apparatus 100 and the lens unit 200 can be mechanically attached to each other via lens mount mechanisms 113 and 204. The lens unit 200 is constituted to include a photographing yens 201, a lens driving circuit 202 and a lens control unit 203. The lens mount 204 includes a connector that electrically connects the lens unit 200 to the camera body 100, and control signals, state signals, data signals and the like can be exchanged between the camera body 100 and the lens unit 200. Also, the connector has a function for supplying various types of electrical power from the camera body 100 to the lens unit 200. Moreover, the connector may be that transmit not only electrical signals but also optical signals, sound signals and the like. In addition, in FIG. 1, the photographing lens 201 is shown by one lens for simplification, but is actually constituted by a group of a large number of lenses.

The lens control unit 203 performs overall control of the lens unit 200. The lens control unit 203 is provided with a memory for storing various constants, variables, programs and the like for operating the lens. The lens control unit 203 is also provided with a non-volatile memory for holding maximum and minimum aperture values, the focal distance and the like that are information specific to the lens unit. Also, this non-volatile memory holds various types of setting information such as driving frequency information of various actuators included in the lens unit 200 such as a focus driving motor and a diaphragm driving motor. The lens control unit 203 is also provided with a DC-DC convertor circuit for power supply that supplies power to the circuit units in the lens unit 200, and the like.

The system control unit 105 of the camera body 100 calculates a defocus amount using output information of the image sensor 101, and performs communication with the lens control unit 203 of the lens unit 200 based on the calculated defocus amount. The lens control unit 203 controls the lens driving circuit 202 so as to perform focusing. In addition, the lens driving circuit 202 is provided with a shake detection means for alleviating camera shake during shooting, a control circuit for driving a movable shift lens for alleviating camera shake, and the like. Camera shake is reduced by the shake detection means outputting the camera shake as an electrical signal, and moving the movable shift lens based on a result of calculating a shake amount.

Figure 2:
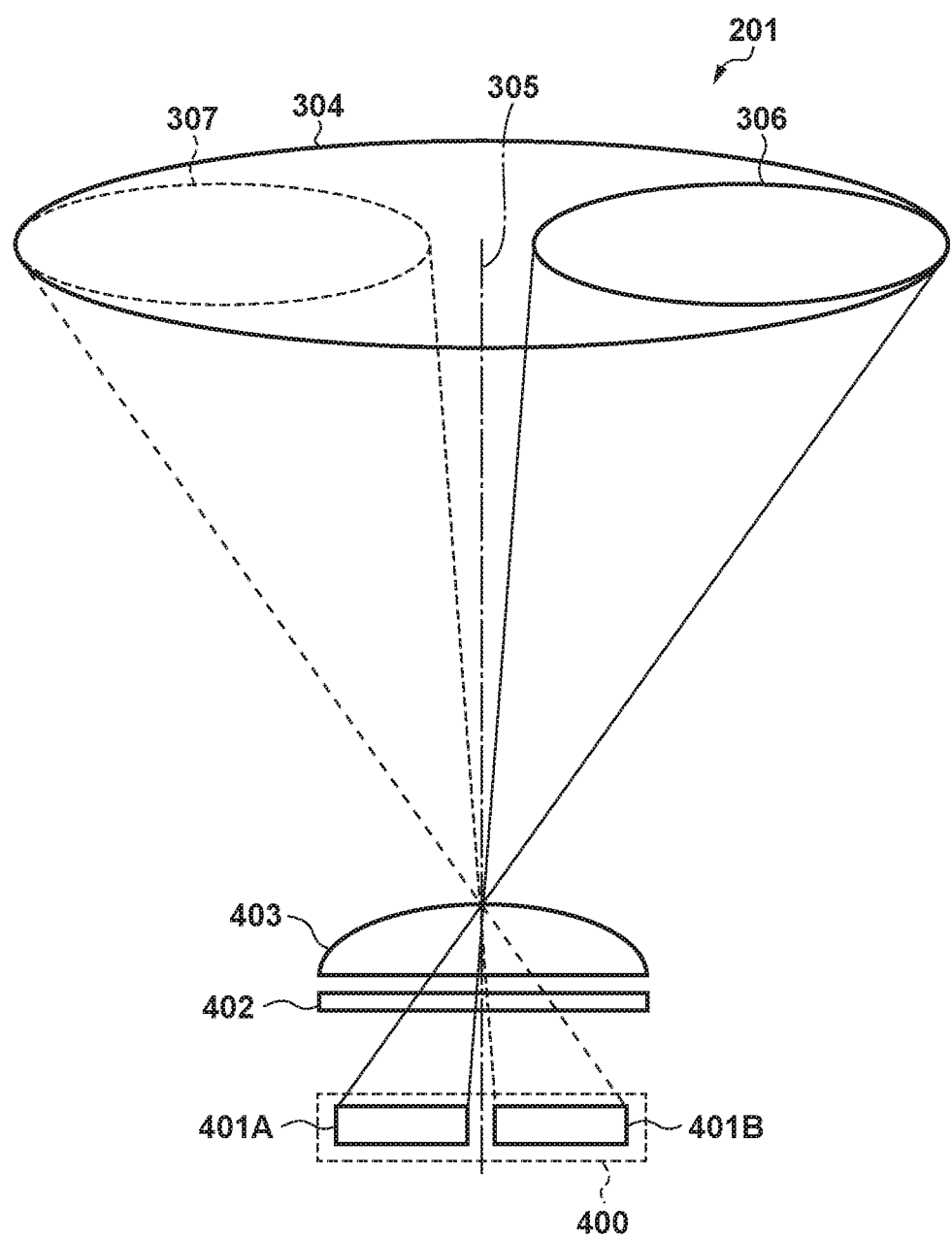
FIG. 2 is a diagram showing a concept according to which a light beam that has passed out of the exit pupil of a photographing lens is incident on a unit pixel.

Next, a principle for realizing focus detection by a phase difference detection method using the image sensor 101 will be described. FIG. 2 is a diagram schematically showing a state in which a light beam that has left the exit pupil of a photographing lens is incident on one of the unit pixels of the image sensor. The unit pixel 400 has a first photodiode (hereinafter, a first PD) 401A and a second photodiode (hereinafter, a second PD) 401B, and is covered by a color filter 402 and a microlens 403.

An optical axis 305 is assumed to be at the center of an exit pupil 304 of the photographing lens 201 relative to a pixel that has the microlens 403. Light that has passed through the exit pupil 304 is incident on the unit pixel 400 centered on the optical axis 305. In addition, as shown in FIG. 2, a light beam that passes through a pupil region 306 that is a partial region of the exit pupil of the photographing lens is received by the first PD 401A through the microlens 403. Similarly, a light beam that passes through a pupil region 307 that is a partial region of the exit pupil 304 is received by the second PD 401B through the microlens 403. Therefore, the first PD 401A and the second PD 401B respectively receive the light beams that have passed through different regions of the exit pupil 304. Therefore, the phase difference can be detected by comparing the signal of the first PD 401A with the signal of the second PD 401B.

Hereinafter, a signal obtained from the first PD 401A is referred to as an A image signal, and a signal obtained from the second PD 401B is referred to as a B image signal. Also, a signal that has been obtained by adding the signal of the first PD 401A and the signal of the second PD 401B and that has been read out can be used as a (A+B) image signal for a shot image.

FIG. 3 is a diagram showing an example of the entire configuration of the image sensor 101 that has a phase difference focus detection function used in this embodiment. The image sensor 101 includes a pixel region 1, a vertical scanning circuit 2, a readout circuit 3, a horizontal scanning circuit 4 and an output amplifier 5. In the pixel region 1, a plurality of the unit pixels 400 are arranged in matrix. Here, arrangement of 4×4=16 pixels shown in order to simplify the description, but a larger number of unit pixels are arranged actually. As described already, each of the unit pixels 400 has the first photodiode (hereinafter, the first PD) 401A and the second photodiode (hereinafter, the second PD) 401B. The vertical scanning circuit 2 selects pixels of the pixel region 1 for each row, and outputs a drive signal to the pixels in the selected row. The readout circuit 3 is provided with a column readout circuit for each column, amplifies output signals from the unit pixels 400, and sample-holds the output signals. The horizontal scanning circuit 4 outputs a signal for sequentially outputting the signals sample-held by the readout circuit 3 to the output amplifier 5 for each column. The output amplifier 5 sends, to a signal processing circuit, signals that have been output from the readout circuit 3 by an operation of the horizontal scanning circuit 4. The vertical scanning circuit 2, the readout circuit 3 and the horizontal scanning circuit 4 are driven by a timing signal from the timing generation circuit 103.

Figure 4:
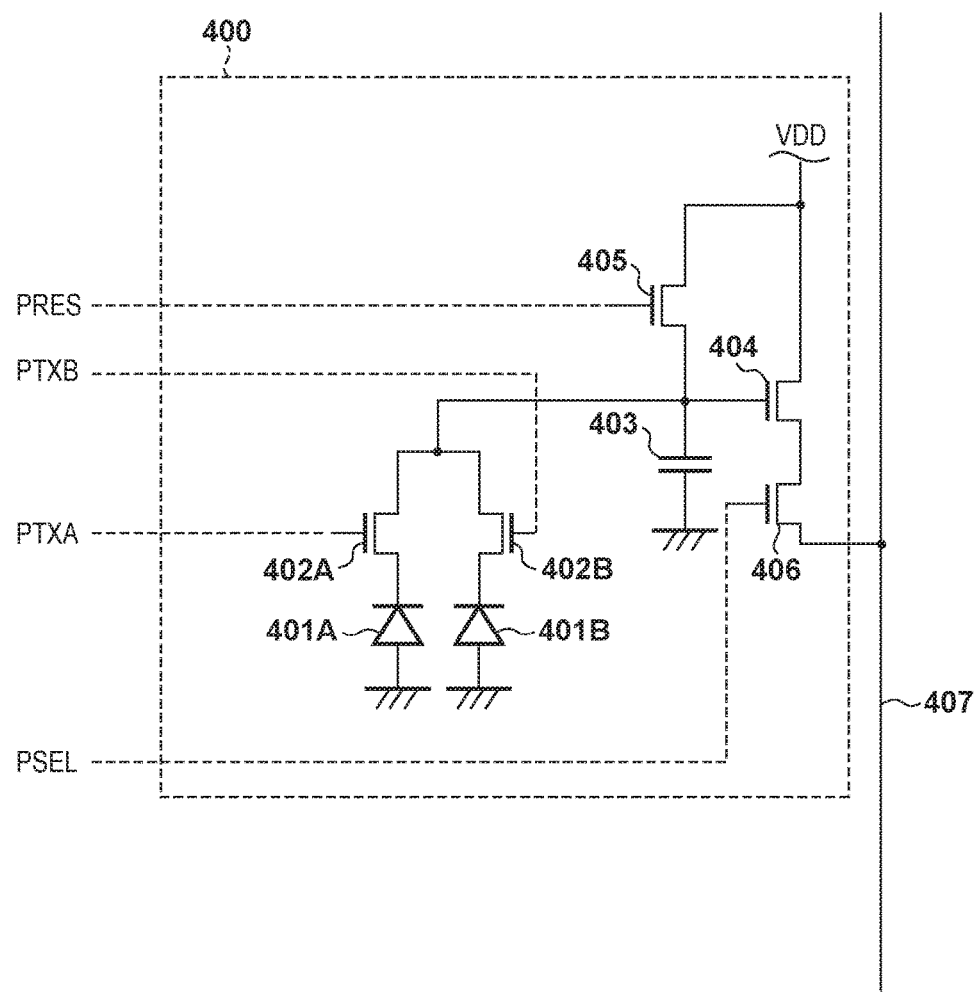
FIG. 4 is a circuit diagram of the unit pixel of the image sensor.

FIG. 4 is a circuit diagram showing an example of the configuration of the unit pixel 400. A first transfer switch 402A and a second transfer switch 402B are respectively connected to the first PD 401A and the second PD 401B. In addition, the output of the first transfer switch 402A and the output of the second transfer switch 402B are connected to an amplification portion 404 through a floating diffusion portion (hereinafter, an FD) 403. A reset switch 405 is connected to the FD 403, and a selection switch 406 is connected to an amplification portion 404.

The first PD 401A and the second PD 401B function as a photoelectric conversion portion that receives light that has passed through the same microlens, and generates signal charges corresponding to the amount of the received light.

The first transfer switch 402A and the second transfer switch 402B are controlled by transfer pulse signals PTXA and PTXB from the vertical scanning circuit 2 so as to respectively transfer electric charges generated in the first PD 401A and the second PD 401B to the common FD 403.

The FD 403 functions as an electric charge voltage conversion unit that temporarily holds the electric charges transferred from the first PD 401A and the second PD 401B, and converts the held electric charges into voltage signals. The amplification portion 404 is a source follower MOS transistor, and amplifies the voltage signals that are based on the electric charges held in the FD 403, and outputs the amplified voltage signals as pixel signals. The reset switch 405 is controlled by a reset pulse signal PRES from the vertical scanning circuit 2, and resets the potential of the PD 403 to a power supply VDD. The selection switch 406 is controlled by a control signal PSEL from the vertical scanning circuit 2 so as to output the pixel signals amplified by the amplification portion 404 to a column output line 407.

Figure 5:
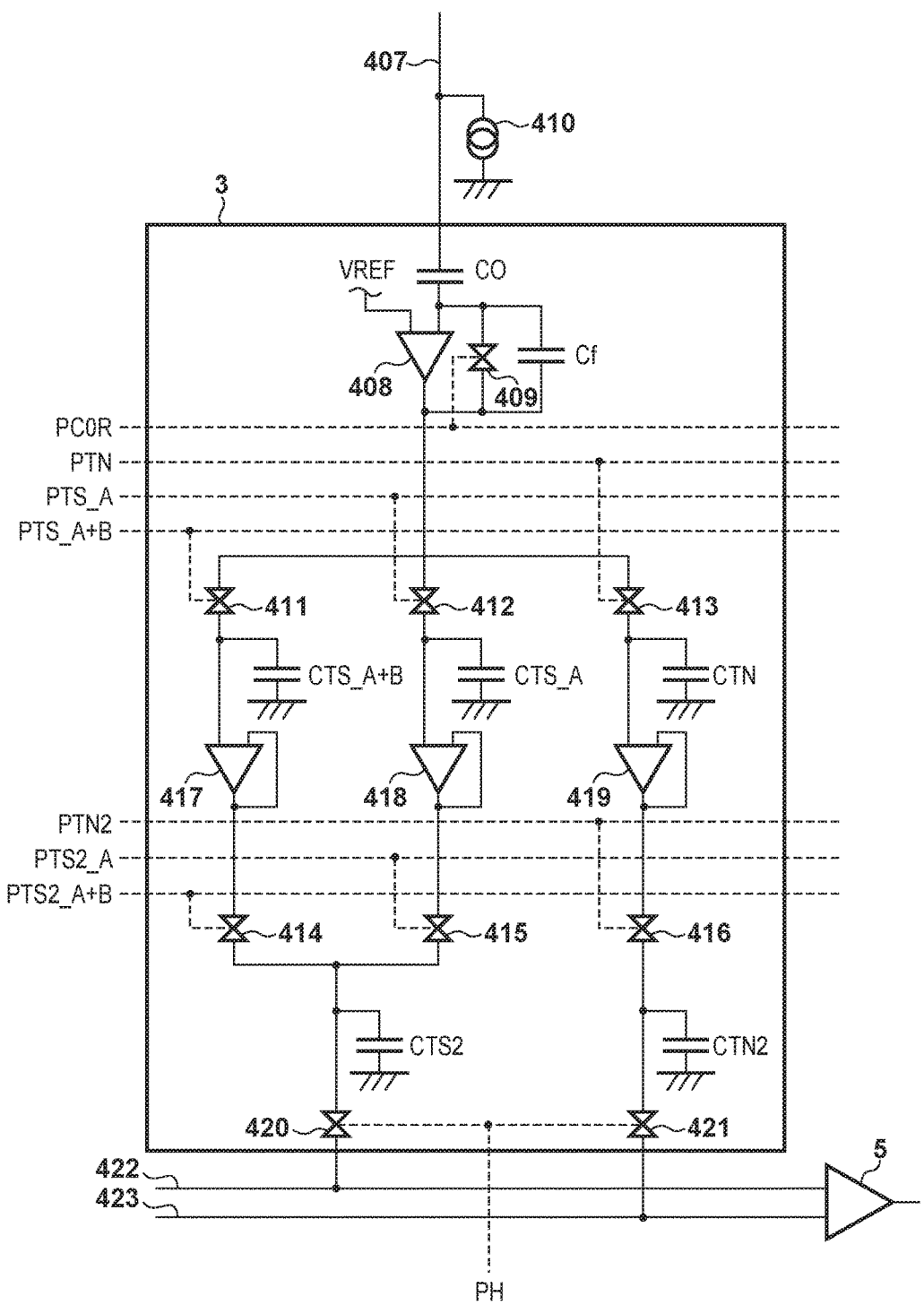
FIG. 5 is a circuit diagram of a readout circuit of the image sensor.

FIG. 5 is a circuit diagram showing an example of the configuration of the readout circuit 3 of FIG. 3 for one column. The readout circuit 3 is provided with a circuit that has a configuration shown in FIG. 5, for each column, but the configuration of each column is common, and thus in FIG. 5, the configuration for only one column is shown. A signal voltage on the column output line 407 is amplified by an operational amplifier 408. A reference voltage VREF is supplied to the operational amplifier 408. A clamp capacitor C0 is connected to the input of the operational amplifier 408, and a feedback capacitor Cf is connected between the input and output of the operational amplifier 408. In addition, a switch 409 for causing the two ends of the feedback capacitor Cf to short-circuit is provided at the two ends of the feedback capacitor Cf, and the switch 409 is controlled by a control signal PC0R of the readout circuit 3. A constant current source 410 is connected to the column output line 407.

Capacitors CTS_A+B, CTS_A and CTN are capacitors for holding signal voltages from the operational amplifier 408. Switches 411, 412 and 413 are switches for respectively controlling writing to the capacitors CTS_A+B, CTS_A and CTN. The switch 411 is controlled by a control signal PTS_A+B, the switch 412 is controlled by a control signal PTS_A, and the switch 413 is controlled by a control signal PTN.

Capacitors CTS2 and CTN2 are capacitors for holding signal voltages from the capacitors CTS_A+B, CTS_A and CTN. Switches 414, 415 and 416 are switches for controlling writing to the capacitors CTS2 and CTN2. The switch 414 is a switch for writing the signal of the capacitor CTS_A+B to the capacitor CTS2, and is controlled by a control signal PTS2_A+B. The switch 415 is a switch for writing the signal of the capacitor CTS_A to the capacitor CTS2, and is controlled by a control signal PTS2_A. The switch 416 is a switch for writing the signal of the capacitor CTS to the capacitor CTN2, and is controlled by the control signal PTN2.

In addition, voltage followers 417, 418 and 419 as buffers are provided immediately upstream of the capacitors CTS2 and CTN2. The voltage followers 417, 418 and 419 transmit, to the capacitors CTS2 and CTN2, potentials that are equal to the potentials accumulated in the capacitors CTS_A+B, CTS_A and CTN respectively, without performing capacitor division.

Switches 420 and 421 are controlled by a control signal PH from the horizontal scanning circuit 4, and the signal written in the capacitor CTS2 is output to the output amplifier 5 via a common output line 422, and the signal written in the capacitor CTN2 is output to the output amplifier 5 via a common output line 423. Note that writing of signals to the capacitors CTS_A+B, CTS_A and CTN and reading out signals from the capacitors CTS2 and CTN2 by horizontal scanning are performed in parallel.

Figure 6:
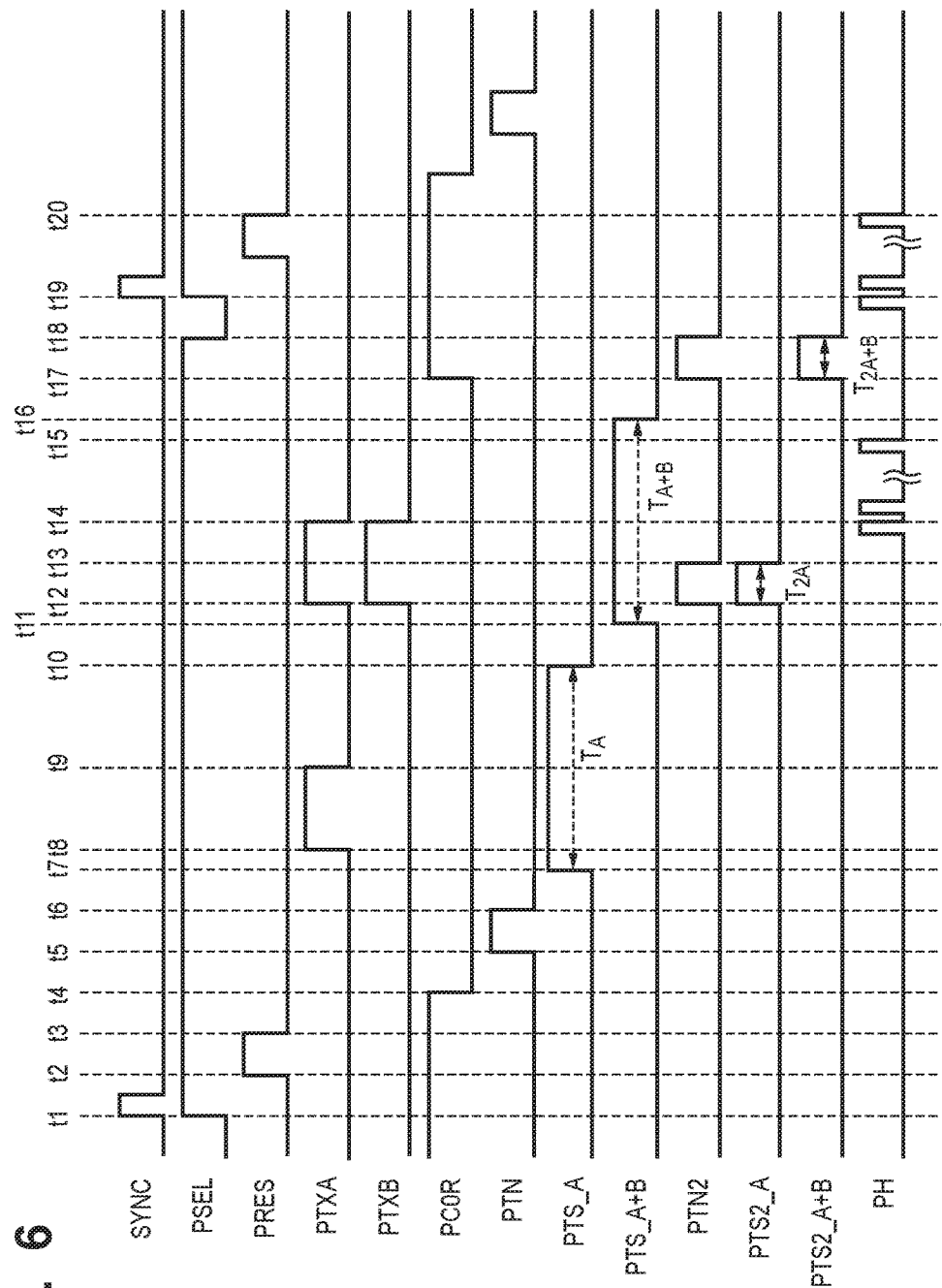
FIG. 6 is a timing chart showing timings for driving the image sensor.

FIG. 6 is a diagram showing a driving timing chart of the image sensor 101. At a time t1, a horizontal synchronization signal SYNC rises, and a control signal PSEL of the selected row changes from L to H. This turns on the selection switch 406 of the selected row, making it possible to output the pixel signals of the selected row to the column output line 407.

At a time t2, a reset pulse signal PRES changes from L to H, the reset switch 405 is turned on, and the potential of the FD 403 is reset to the power supply VDD. At a time t3, the reset pulse signal PRES changes from H to L, the reset switch 405 is turned off, and reset of the FD 403 is cancelled. The potential of the FD 403 at this time is read out as a reset signal level to the column output line 407 via the amplification portion 404, and is input to the readout circuit 3. In the readout circuit 3, a control signal PC0R is at H and a switch 406 is on, and in the state where the operational ampler 408 buffers output of the reference voltage VREF, the reset signal level is input to the clamp capacitor C0.

After that, at a time t4, a control signal POOR is changed from H to L, and at a time t5, a control signal PTN set to H to turn on the switch 413, and the output of the operational amplifier 408 at this time is written as a reset voltage to the capacitor CTN. After that, at a time t6, the control signal PTN is set to L, the switch 413 is turned off and writing of the reset voltage to the capacitor CTN ends. This period from the time t5 to the time t6 is referred to as an "N readout" (noise component readout) period.

After "N readout" ends, at a time t7, a control signal PTS_A is set to H, the switch 412 is turned on such that signals can be written to the capacitor CTS_A. Subsequently, at a time t8, a transfer pulse signal PTXA is set to H, electric charges of the first PD 401A are transferred to the FD 403, and at a time t9, the transfer pulse signal PTXA is set to L. Due to this operation, the electric charges accumulated in the first PD 401A are read out to the FD 403. Output corresponding to the change in potential of the FD 403 is then supplied to the readout circuit 3 via the amplification portion 404 and the column output line 407. In the readout circuit 3, the operational amplifier 408 amplifies a voltage supplied from the column output line 407 at a gain that is based on the ratio of the clamp capacitor C0 to the feedback capacitor Cf, and outputs the amplified voltage. This signal voltage provided from the first PD 401A is written to the capacitor CTS_A. At a time t10, the control signal PTS_A is switched from H to L, the switch 412 is turned off, and writing to the capacitor CTS_A ends. This period from the time t7 to the time t10 in which the signals accumulated in the first PD 401A are read out is referred to as an "S_A readout" (A image signal readout) period.

At a time t11, a control signal PTS_A+B is set to H, and the switch 411 is turned on such that signals can be written to the capacitor CTS_A+B. Subsequently, at a time t12, the transfer pulse signal PTXA is set to H again, and at the same time, a transfer pulse signal PTXB is also set to H. This operation makes it possible to read out electric charges of both the first PD 401A and the second PD 401B to the PD 403 at the same time. At a time t14, the transfer pulse signals PTXA and PTXB are then set to L. The electric charges read out to the PD 403 are converted into a voltage by the amplification portion 404, supplied to the readout circuit 3 via the column output line 407, and amplified by the operational amplifier 408. The signals amplified by the operational amplifier 408 are written to the capacitor CTS_A+B. At a time t16, the control signal PTS_A+B is switched from H to L, the switch 411 turned off, and writing to the capacitor CTS_A+B ends. This period from the time t11 to the time t16 for which the signals accumulated in the first PD 401A and the second PD 401B are read out is referred to as an "S_A+B readout" (A+B image signal readout) period. The above operations complete signal writing to the capacitors CTN, CTS_A and CTS_A+B.

Note that at the time t12, the transfer pulse signals PTXA and PTXB are set to H at the same time, but a configuration may be adopted in which only the transfer pulse signal PTXB is set to H, and electric charges of the second PD 401B are transferred to the FD 403. In this case, electric charges of the first PD 401A have already been transferred to the FD 403, and thus output obtained by adding the electric charges of the first PD 401A and the second PD 401B can be obtained.

At a time t17, the control signal PC0R is set to H again, the switch 406 is turned on, and in the readout circuit 3, the operational amplifier 408 buffers output of the reference voltage VREF again. Subsequently, at a time t18, a vertical selection pulse signal PSEL is set to L, and readout of signals from the pixels in the selected row ends, and the selected row is disconnected from the column output line 407. After that, at a time t19, the horizontal synchronization signal SYNC rises again, and at the same time, the vertical selection pulse signal PSEL in the next row is changed to H, and selection of the pixels in the next row is started.

In addition, in parallel with writing of a (A+B) image signal to the capacitor CTS_A+B, at the time t12, a control signal PTS2_A and a control signal PTN2 are changed from L to H, and the switches 415 and 416 are turned on. The signal held in the capacitor CTN is written to the capacitor CTN2 via the voltage follower 419, and the signal held in the capacitor CTS_A is written to the capacitor CTS2 via the voltage follower 418. Subsequently, at a time t13, the control signal PTN2 and the control signal PTS2_A change from H to L at the same time, and writing to the capacitor CTN2 and the capacitor CTS2 ends.

After that, between the time t13 and a time t15, a driving pulse PH of the horizontal scanning circuit 4 sequentially changes from L→H→L for the readout circuit of each column. According to this, the switches 420 and 421 for each column are turned off→on→off, and horizontal scanning is performed. When the switches 420 and 421 are turned off→on→off, the signals held in the capacitor CTS2 and CTN2 of each column are respectively read out to the common output lines 422 and 423, and are output as a difference voltage of the signals of the common output lines 422 and 423 by the output amplifier 5. This difference voltage becomes an A image signal. By performing an operation of calculating the difference voltage between this pixel signal level and a noise signal level (hereinafter, an "S−N" operation), it becomes possible to avoid the influence of fixed pattern noise caused by manufacturing variation and the like, and to obtain an image with high S/N. Note that the common output lines 422 and 423 are reset to a reference potential by a reset switch (not illustrated) every time signals of a column are read out.

Here, horizontal scanning of A image signals is performed while (A+B) image signals are being written to the capacitor CTS_A+B (a period of TA+B). This horizontal scanning period ends by the time t16 at which writing to the capacitor CTS_A+B ends. After the (A+B) image signals are written to the capacitor CTS_A+B, the (A+B) image signals are written to the capacitor CTS2 and are subjected to horizontal scanning. These operations are performed in parallel with reset of the FD 403 of the next row and writing to the capacitors CTN and CTS_A. At the time t17, the control signal PTN2 and a control signal PTS2_A+B are changed from L to H at the same time, and thereby the switches 414 and 416 are turned on. The signal held in the capacitor CTN is written to the capacitor CTN2 via the voltage follower 419. Furthermore, the signal held in the capacitor CTS_A+B is written to the capacitor CTS2 via the voltage follower 417. Subsequently, at the time t18, the control signal PTN2 and the control signal PTS2_A+B change from H to L at the same time, and writing ends.

After that, horizontal scanning is performed on the signals held in the capacitors CTN2 and CTS2 by the driving pulse PH of the horizontal scanning circuit 4 sequentially changing from L to H and H to L between the time t18 and a time t20. The switches 420 and 421 of each column are driven by the driving pulse PH to be turned off, on and off. The signals held in the capacitors CTS2 and CTN2 of each column are respectively read out to the common output lines 422 and 423 by the switches 420 and 421, and are output as a difference voltage between the common output lines 422 and 423 by the output amplifier 5. This difference voltage will be used as the (A+B) image signal.

Here, horizontal scanning of the (A+B) image signals is performed in parallel with resetting of the FD 403 of the next row and writing to the capacitors CTN and CTS_A. The processing time can be shortened by performing these operations in parallel. This horizontal scanning period can be completed by the next time t20 at which writing to the capacitor CTS_A of the next row ends.

Information regarding a light beam that passes through a portion of the pupil of the photographing lens is obtained from the A image signal read out in this manner, and furthermore, a B image signal (a signal other than that of the photoelectric conversion portion for the A image) that is an output signal from the second PD 401B can be obtained by obtaining the difference between the (A+B) image signal and the A image signal. Information regarding a light beam that has passed through a pupil region different from that of the A image signal is obtained from this B image signal. Therefore, it is possible to calculate the phase difference from information regarding these two light beams for the A image signal and the B image signal, and to obtain focus information and distance information of the subject.

Incidentally, as shown in the timing chart of the image sensor in FIG. 6, "N readout", "S_A readout" and "S_A+B readout" operations of the image sensor that has a phase difference focus detection function are not performed at the same time. Therefore, if a conventional power supply unit as shown in FIG. 21 is used as a power supply unit, the following problem occurs.

Figure 7:
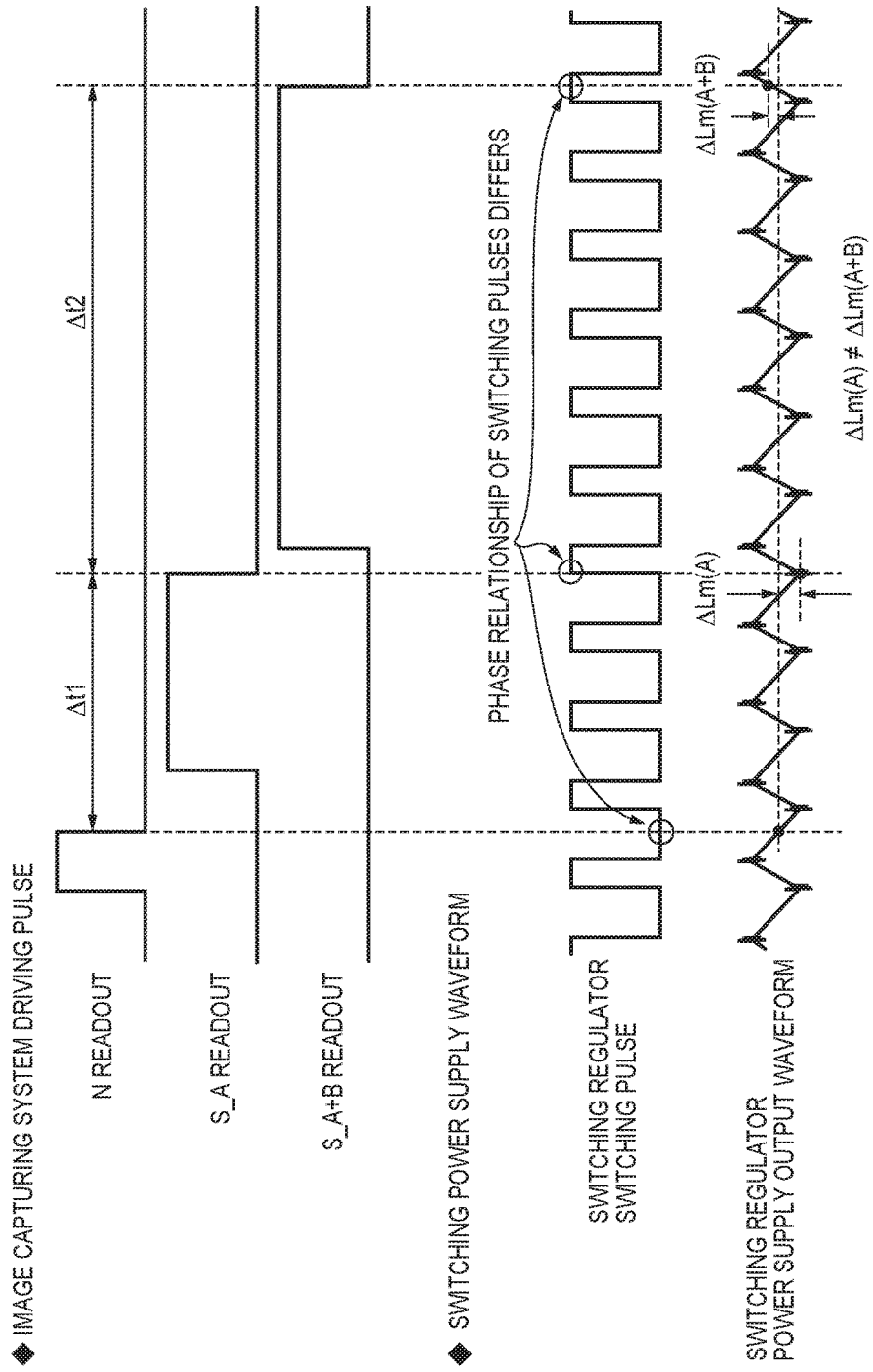
FIG. 7 is a diagram showing a state where a noise difference amount of a switching regulator differs for each readout timing.

Specifically, the influence of switching noise that occurs when the switching regulator 501 of the power supply unit in FIG. 21 operates, magnetic field noise that occurs from a coil constituting the switching regulator 501, or the like is superimposed at the time of "N readout", "S_A readout" and "S_A+B readout" of the image sensor. If such influence is superimposed, the difference amount of potential levels differs between an A image and an A+B image at the time of an S−N operation, and furthermore it differs for each row, and thus this becomes offset noise, deteriorating S/N. This S/N deterioration affects occurrence of image noise of a shot image, deterioration in focus detection accuracy and the like. FIG. 7 shows the state where this difference amount of potential levels at the time of "N readout", "S_A readout" and "S_A+B readout" differs for each readout timing.

Figure 8:
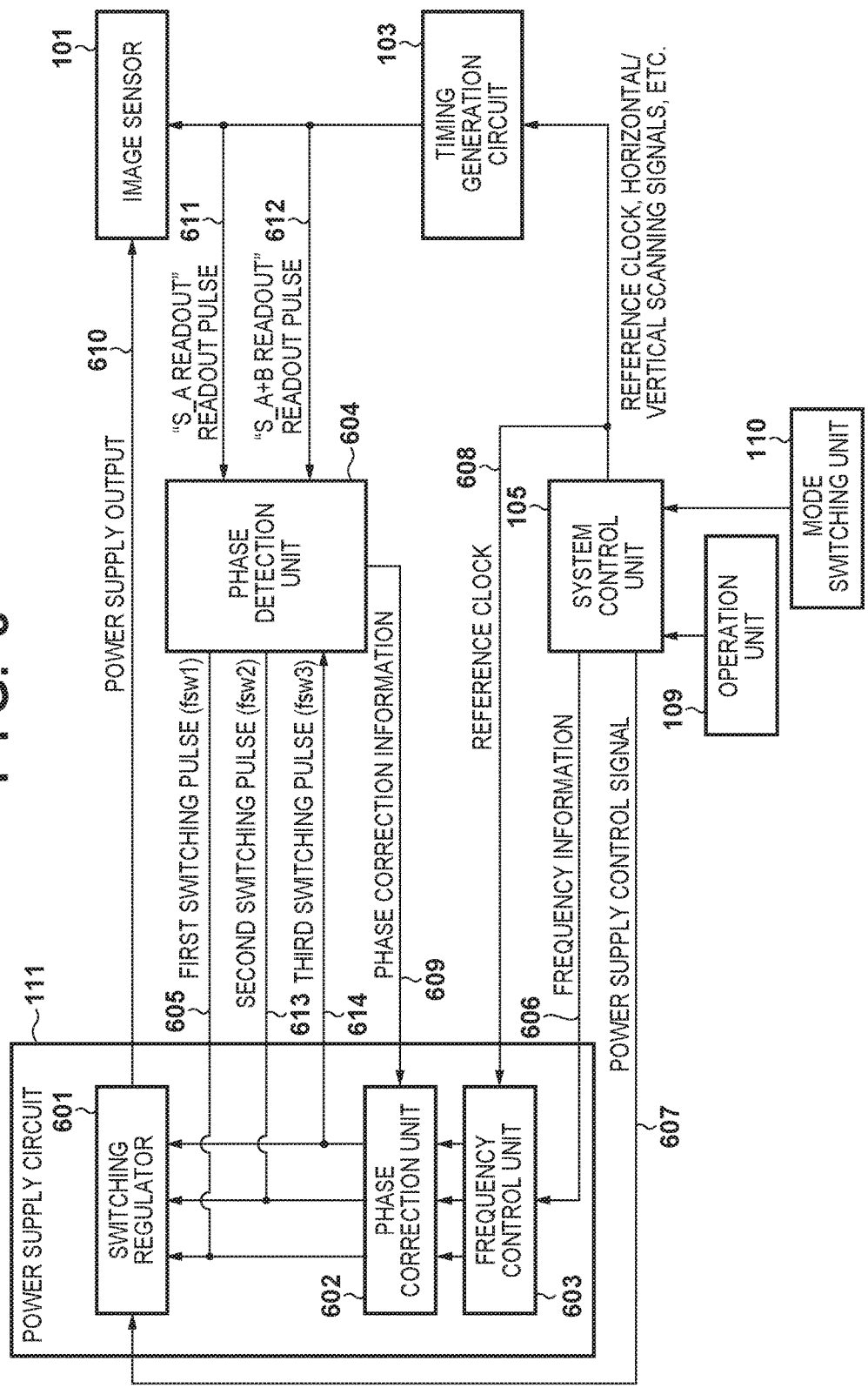
FIG. 8 is a diagram showing the configuration of a portion of the image capturing apparatus of the first embodiment.

A technique for solving the above-described problem will be described below. FIG. 8 is a schematic diagram showing a portion of the configuration of the power supply unit and the image capturing apparatus in this embodiment. In FIG. 8, the power supply circuit 111 is constituted to include a switching regulator 601 for converting an input voltage into an output voltage of a different value under control of a switching element, a phase correction unit 602 and a frequency control unit 603, and output from the power supply circuit 111 is supplied to the image sensor 101 and the like.

Figure 11A:
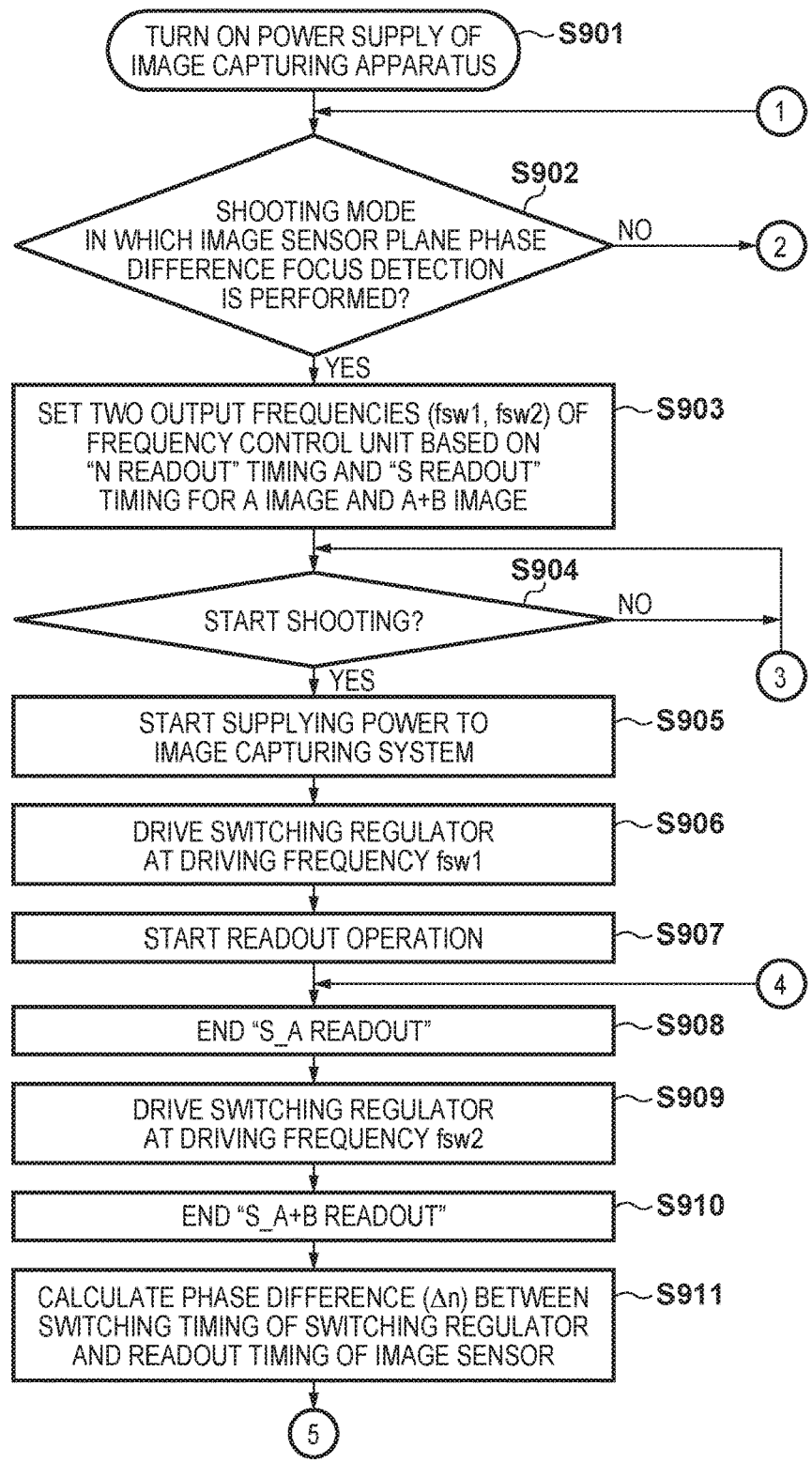
FIGS. 11A to 11C are flowcharts showing operations of the image capturing apparatus of the first embodiment.
Figure 11B:
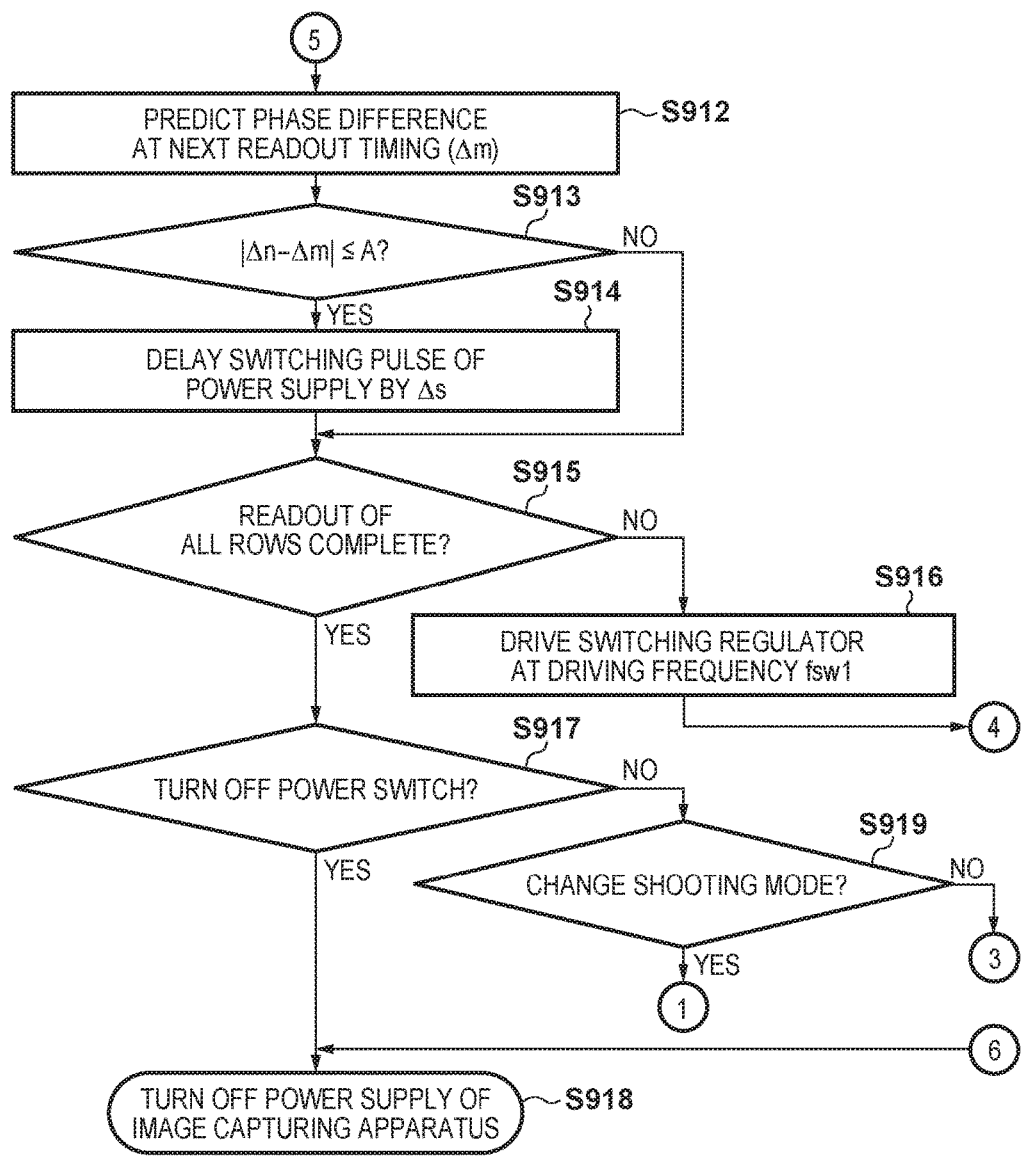
Figure 11C:
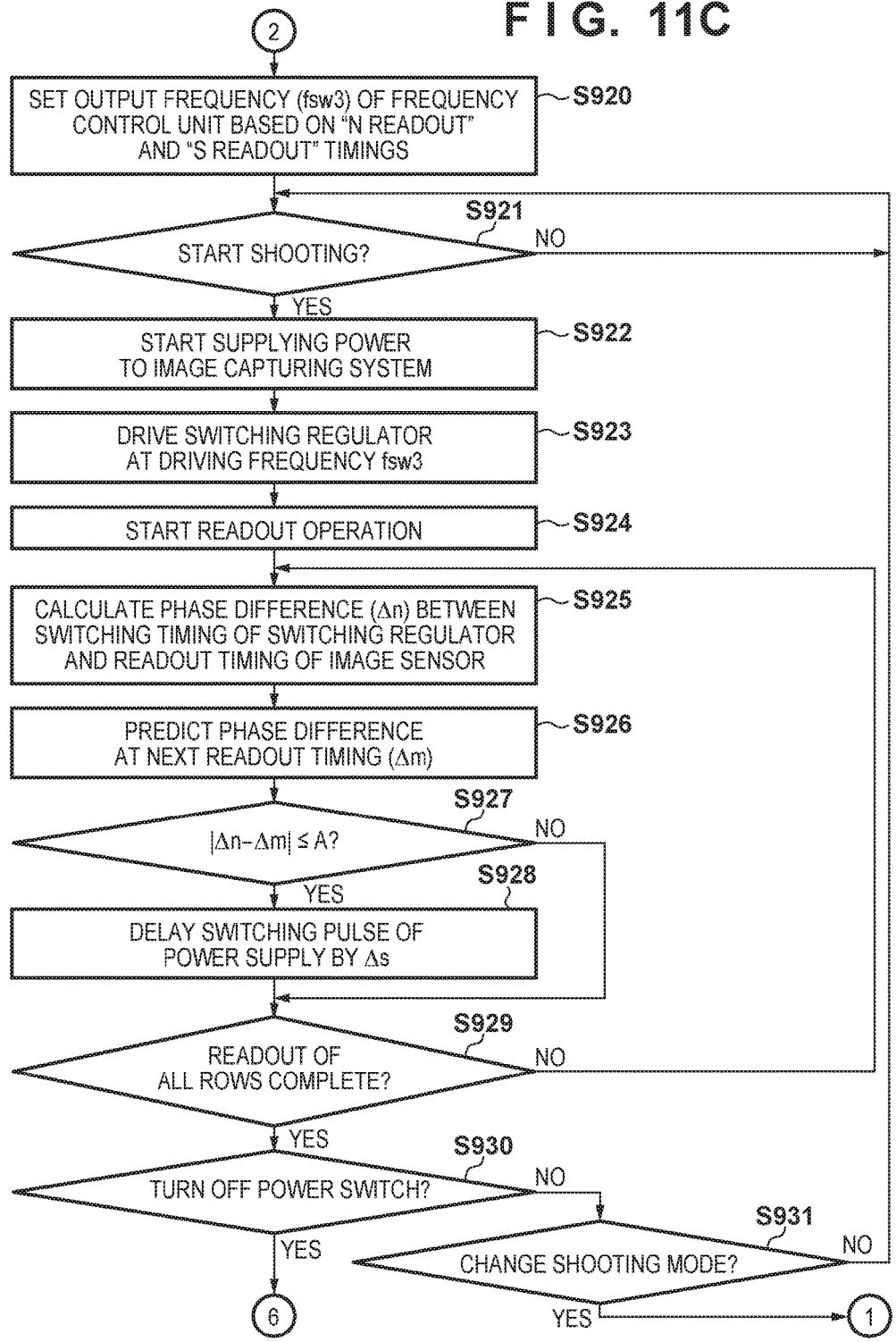

FIGS. 11A to 11C are flowcharts showing an image capturing operation in this embodiment. A series of flows of the image capturing operation in the image capturing apparatus of this embodiment will be described with reference to FIGS. 8 and 11A to 11C.

After the image capturing apparatus is activated by the power switch in step S901, a standby state is entered in which power is not supplied to constituent elements of the image capturing system such as the image sensor 101, until the procedure transitions to a shooting operation. In step S902, the user can select a shooting mode such as still image shooting, moving image shooting or live view shooting using the mode switching unit 110. If the selected shooting mode is a moving image shooting mode or a live view shooting mode in which phase difference focus detection is performed, the procedure advances to step S903, and otherwise, the procedure advances to step S920.

In step S903, the system control unit 105 sends, to the frequency control unit 603, frequency information 606 determined based on the readout cycle of the image sensor 101 in the case where phase difference focus detection is performed. Subsequently, the frequency control unit 603 respectively sets the frequencies of first and second switching pulses generated from a reference clock 608 of the image capturing system as a first driving frequency fsw1 and a second driving frequency fsw2, based on this frequency information 606. The first driving frequency fsw1 and the second driving frequency fsw2 are set so as to satisfy the following relationship with "N readout", "S_A readout" and "S_A+B readout" timings of the image sensor 101.

First, the first driving frequency fsw1 will be described with reference to FIG. 12 as well. This first driving frequency fsw1 is expressed by Expression 1 below, in which a period from the "N readout" timing of the image sensor 101 until the "S_A readout" timing is indicated by Δt1, and an integer by which a switching frequency at which the switching regulator 601 can be driven is multiplied is indicated by K1.

$$\text{fsw1} = K1/\Delta t1 \qquad 1$$

Δt1: a period from "N readout" until "S_A readout"
K1: an integer by which a switching frequency at which a power supply IC can be driven is multiplied Next, the second driving frequency fsw2 will be described with reference to FIG. 12 as well. This second driving frequency fsw2 is expressed by Expression 2 below, in which a period from the "S_A readout" timing of the image sensor 101 until the "S_A+B readout" timing is indicated by Δt2, and an integer by which a switching frequency at which the switching regulator 601 can be driven is multiplied is indicated by K2.

$$\text{fsw2} = K2/\Delta t2 \qquad 2$$

Figure 9:
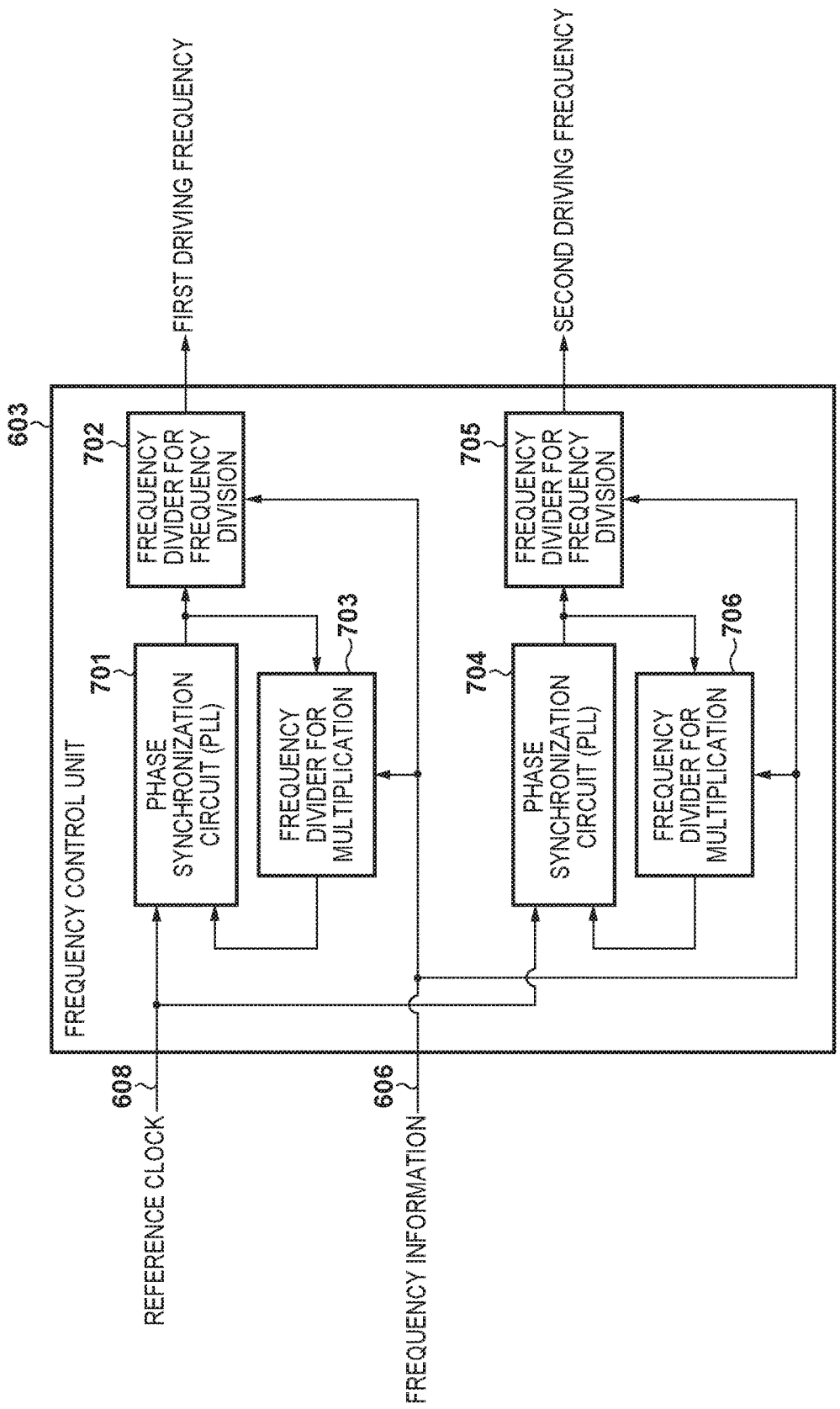
FIG. 9 is a diagram showing the configuration of a frequency control unit in the first embodiment.

Δt2: a period from "S_A readout" until "S_A+B readout"
K2: an integer by which a switching frequency at which the power supply IC can be driven is multiplied Here, the frequency control unit 603 is constituted as shown in FIG. 9 using phase synchronization circuits (PLL) 701 and 704, for example. Frequency dividers 702 and 705 for frequency division are respectively arranged at the outputs of the phase synchronization circuits 701 and 704, and frequency dividers 703 and 706 for multiplication are respectively arranged at the inputs of the phase synchronization circuits 701 and 704. By performing frequency division on the reference clock 608 of the image capturing system at a desired frequency dividing ratio based on the frequency information 606, it is possible to generate a driving frequency of the switching regulator 601 at a multiplication frequency that is synchronized with the periods of $\Delta t1$ and $\Delta t2$.

Returning to FIGS. 11A to 11C, in step S904, a live view shooting operation is started by turning on a shooting start switch. In step S905, the system control unit 105 sends, to the switching regulator 601, a power supply control signal 607 for instructing to supply power to the image capturing system. The switching regulator 601 that has received the power supply control signal 607 then supplies power to the image sensor 101 at a predetermined driving frequency that has been set initially, and the image sensor 101 is initialized.

In step S906, the system control unit 105 sends the reference clock 608 of the image capturing system to the frequency control unit 603. The frequency control unit 603 converts the reference clock 608 of the image capturing system into first and second switching pulses 605 and 613 based on the frequency information set in step S903. The first and second switching pulses 605 and 613 that are output from the frequency control unit 603 are input to the phase correction unit 602. At the time of reading out, the first row, the phase correction unit 602 inputs the first and second switching pulses 605 and 613 to the switching regulator 601 without performing a phase correction control operation. The switching regulator 601 then starts driving at the first driving frequency fsw1 of the first switching pulse 605, and supplies power to the image sensor 101.

In step S907, the system control unit 105 sends, to the timing signal generation circuit 103, a reference clock of the image capturing system and image capturing system control signals such as a horizontal scanning signal and a vertical scanning signal, and starts an image readout operation of the image sensor 101. When "S_A readout" ends in step S908, the driving frequency of the switching regulator 601 is changed to the second driving frequency fsw2 of the second switching pulse 605 in step S909. Subsequently, in step S910, "S_A+B readout" ends.

In step S911, a phase detection unit 604 calculates a phase difference $\Delta n1$ between the first switching pulse 605 of the switching regulator 601 and a readout pulse 611 of "S_A readout" of the image sensor 101. Furthermore, the phase detection unit 604 calculates phase difference $\Delta n2$ between the second switching pulse 613 of the switching regulator 601 and a readout pulse 612 of "S_A+B readout" of the image sensor 101.

After that, in step S912, the phase detection unit 604 performs prediction calculation of phase differences ($\Delta m1$, $\Delta m2$) at the readout timing of the next row. $\Delta mx$ is a parameter expressed by the relationship $\Delta mx=\Delta nx\pm\alpha x$ (x indicates 1 or 2). Here, $\alpha x$ is a parameter that indicates a phase shift amount for each row that occurs in the first switching pulse 605 of the switching regulator 601 and the readout pulse 611 of "S_A readout" of the image sensor 101, and the second switching pulse 613 and the readout pulse 612 of "S_A+B readout". If the switching cycle of the switching regulator 601 is not an integral multiple of the cycle of the horizontal scanning signal of the image sensor 101, shift of $\alpha x$ occurs in the phase relationship of those cycles for each row. Therefore, by performing the above-described calculation, it becomes possible to predict the phase difference ($\Delta mx$) at the readout timing of the next row.

Subsequently, in step S913, it is determined whether or not the relationship $|\Delta nx-\Delta mx|=\alpha x\leq A$ is satisfied. Here, A is a value in which the influence of frequency accuracy variation due to the surrounding environment, manufacturing variation of components constituting the hardware and the like is taken into consideration, regarding the phase shift amount $\alpha x$ for each row. If the above relational expression is not satisfied, the first and second switching pulses 605 and 613 of the switching regulator 601 and the readout pulses 611 and 612 of "S_A readout" and "S_A+B readout" of the image sensor 101 do not overlap in the next row. Therefore, step S914 is skipped, and the procedure transitions to step S915. On the other hand, if the above-described relationship is satisfied, there is a possibility that those pulses overlap, and thus the procedure transitions to step S914, where the phase detection unit 604 sends, to the phase correction unit 602, phase correction information 609 for shifting the phase by a phase correction amount. The phase correction unit 602 performs phase correction of the first or second switching pulses 605 or 613.

Here, the phase correction unit 602 is constituted as shown in FIG. 10 using a plurality of delay circuits 801 and a selector 802, for example. The phase correction unit 602 performs phase correction of an input pulse of the phase correction unit 602, by the selector 802 determining which one of the delay circuits 801 is to output a signal, based on the phase correction information 609 received from the phase detection unit 604. Here, the input pulse is assumed to be an output pulse of the frequency control unit 603. In addition, regarding a phase correction amount $\Delta s$ in this phase correction unit 602, it suffices that the phase is shifted by the spike width of the switching regulator 601 or more, for example. By performing control in this manner, it is possible to perform control such that each signal readout timing of the image sensor 101 and switching timing do not overlap. Therefore, it is possible to avoid the influence of steep power supply voltage variation that occurs at a switching timing of the switching regulator 601.

Subsequently, in step S915, it is determined whether or not readout of all the rows is complete. If readout of all the rows is not complete, the driving frequency of the switching regulator 601 is changed to the first driving frequency fsw1 in step S916, and the procedure returns to step S908, and similar processing is performed. When readout of all the rows is complete, the procedure transitions to step S917.

In step S917, it is determined whether or not to turn off the power switch, and if the power switch is not to be turned off, the procedure transitions to step S919, where it is determined whether or not to change the shooting mode. If the shooting mode is not to be changed, the procedure returns to step S904, where the on state of the shooting start switch is detected, and if the shooting mode is to be changed, the procedure returns to S902, where a shooting mode is selected. In step S917, if the power switch is to be turned off, the procedure transitions to step S918, where the power supply of the image capturing apparatus is turned off.

On the other hand, in step S902, if the shooting mode selected using the mode switching unit 110 is the moving image shooting mode, the live view shooting mode or the still image shooting mode in which phase difference focus detection is not performed, the procedure advances to step S920.

In step S920, the system control unit 105 sends, to the frequency control unit 603, the frequency information 606 determined based on the image capturing readout cycle at the time of moving image shooting, live view shooting or still image shooting in which phase difference focus detection is not performed. The frequency control unit 603 then sets the frequency of a third switching pulse generated from the reference clock 608 of the image capturing system as a third driving frequency fsw3 based on this frequency information 606. This third driving frequency fsw3 is set so as to satisfy the following relationship with the timings of "N readout" and "S_A+B readout" of the image sensor 101.

The driving frequency fsw3 is expressed by Expression 3 below, in which a period from the timing of "N readout" of the image sensor 101 until the timing of "S_A+B readout" is indicated by Δt3, and any integer by which a switching frequency at which the switching regulator 601 can be driven is multiplied is indicated by K3.

$$fsw3=K3/\Delta t3 \qquad 3$$

Δt3: a period from "N readout" to "S_A+B readout"
K3: an integer by which a switching frequency at which the power supply IC can be driven is multiplied In step S921, a shooting operation is started by turning on the shooting start switch. In step S922, the system control unit 105 sends, to the switching regulator 601, the power supply control signal 607 for instructing to supply power to the image capturing system. The switching regulator 601 that has received the power supply control signal 607 then supplies power to the image sensor 101 at a predetermined driving frequency that has been set initially, and the image sensor 101 is initialized.

In step S923, the system control unit 105 sends the reference clock 608 of the image capturing system to the frequency control unit 603, and the frequency control unit 603 converts the reference clock 608 of the image capturing system into a third switching pulse 614 based on the frequency information set in step S920. The third switching pulse 614 that is output from the frequency control unit 603 is input to the phase correction unit 602. The phase correction unit 602 inputs the third switching pulse 614 to the switching regulator 601 at the time of reading out the first row without performing a phase correction control operation. The switching regulator 601 then starts driving at the third driving frequency fsw3 of the third switching pulse, and supplies power to the image sensor 101.

In step S924, the system control unit 105 sends the reference clock of the image capturing system and the image capturing system control signals such as a horizontal scanning signal and a vertical scanning signal to the timing signal generation circuit 103. In step S925, the phase detection unit 604 calculates a phase difference Δn3 between the third switching pulse 614 of the switching regulator 601 and the readout pulse 612 of "S_A+B readout" of the image sensor 101.

After that, in step S926, the phase detection unit 604 performs prediction calculation of a phase difference Δm3 at the readout timing of the next row. Δm3 is a parameter that is expressed as the relationship Δm3=Δn3+α3. Here, α3 is a parameter indicating a phase shift amount for each row in which the third switching pulse 614 of the switching regulator 601 and the readout pulse 612 of "S_A+B readout" of the image sensor 101 occur. If the switching cycle of the switching regulator 601 is not an integral multiple of the cycle of the horizontal scanning signal of the image sensor 101, a shift of α3 occurs in the phase relationship between those cycles for each row. Therefore, the phase difference Δm3 at the readout timing of the next row can be predicted by performing the above-described calculation.

Subsequently, in step S927, it is determined whether or not the relationship |Δn3−Δm3|=α3≤A is satisfied. If the above relational expression is not satisfied, the third switching pulse 614 of the switching regulator 601 and the readout pulse 612 of "S_A+B readout" of the image sensor 101 do not overlap in the next row. Therefore, step S928 is skipped, and the procedure transitions to step S929. On the other hand, if the above relationship is satisfied, there is a possibility that both pulses overlap, and thus the procedure transitions to step S928. Subsequently, the phase detection unit 604 sends, to the phase correction unit 602, the phase correction information 609 for shifting the phase by a phase correction amount, and the phase correction unit 602 performs phase correction of the third switching pulse 614.

Subsequently, in step S929, it is determined whether or not readout of all the rows is complete. If readout of all the rows has not been completed yet, the procedure returns to step S925, where similar processing is performed. If readout of all the rows is complete, the procedure transitions to step S930.

In step S930, it is determined whether or not to turn off the power switch, and if the power switch is not to be turned off, the procedure transitions to step S931, and it is determined whether or not to change the shooting mode. If the shooting mode is not to be changed, the procedure returns to step S921, where the on state of the shooting start switch is detected, and if the shooting mode is to be changed, the procedure returns to step S902, where a shooting mode is selected. If it is determined in step S930 that the power switch is to be turned off, the procedure transitions to step S918, where the power supply of the image capturing apparatus is turned off.

Figure 12:
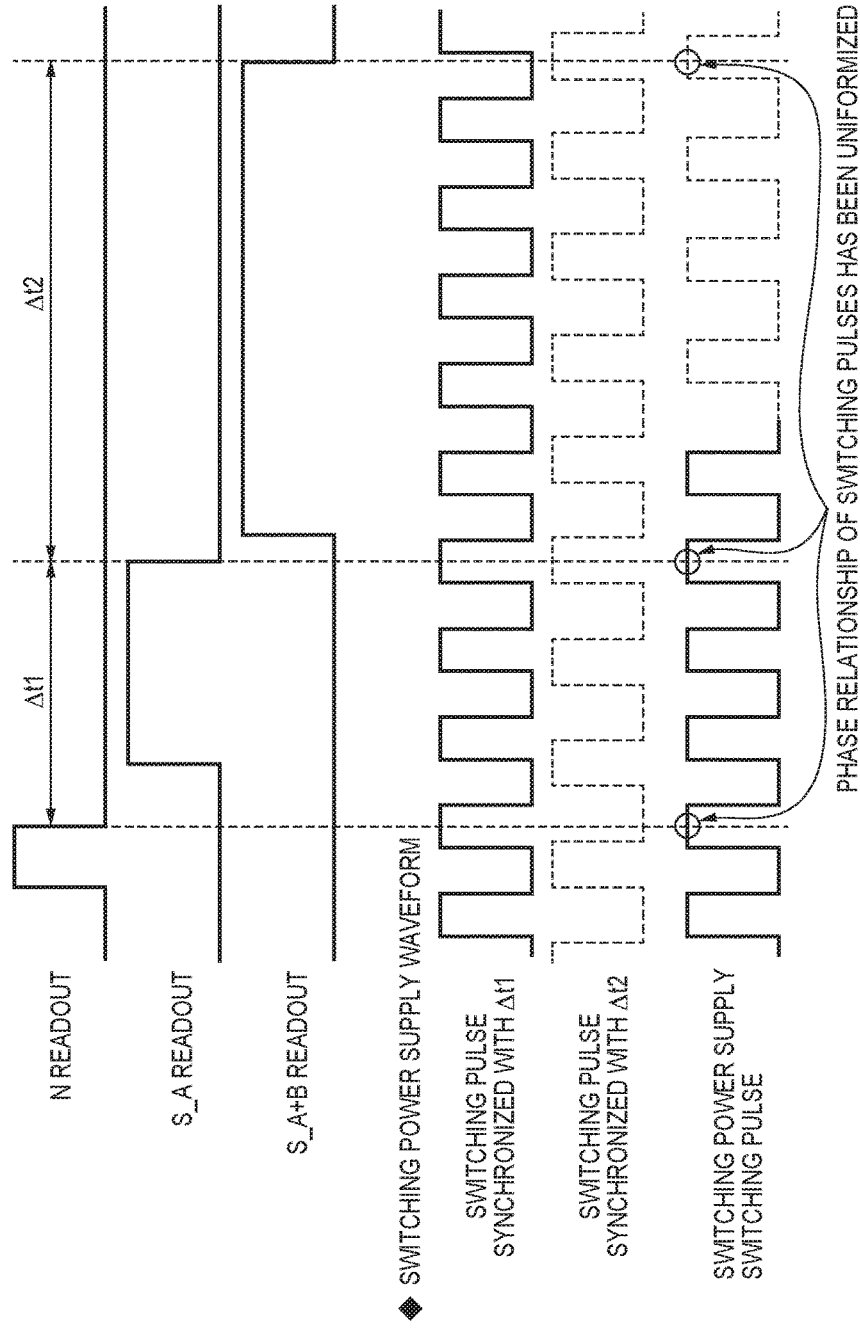
FIG. 12 is a diagram showing the phase relationship between readout timing and switching timing of the switching regulator.

FIG. 12 is a diagram showing a state where, by performing frequency control of this embodiment, the phase relationship between "N readout", "S_A readout" and "S_A+B readout" timings and switching timings of the switching regulator is the same for all the timings. In this embodiment, as in FIG. 12, a first driving frequency that is synchronized with the period Δt1 between the "N readout" timing and the "S_A readout" timing of the image sensor is generated in the frequency control unit based on the reference clock of the image capturing system. Also, similarly, a second driving frequency that is synchronized with the period Δt2 between the "S_A readout" timing and the "S_A+B readout" timing is generated. The phase relationship between all the readout timings of the image sensor and the switching timings of the switching regulator is then uniformized by switching the driving frequency of the switching regulator at predetermined timings.

As described above, by controlling the driving frequency of the switching regulator according to an operation of the image sensor, it becomes possible to uniformize the phase relationship between "N readout", "S_A readout" and "S_A+B readout" timings of the image sensor and switching timings of the switching regulator for all the readout timings. Therefore, it becomes possible to equalize the difference amounts of potential levels of "N readout", "S_A readout" and "S_A+B readout". As a result, it is possible to suppress the influence of noise caused by the switching regulator on a shot image, improve the accuracy of readout signals, and reduce horizontal-striped noise that appears in the shot image.

Note that in this embodiment, the phase difference between switching pulses of the switching regulator and readout pulses of the image sensor is detected for each row, but the present invention is not limited thereto. For example, a configuration may be adopted in which only the readout timing of the first row is detected, a row with respect to which readout thereof possibly overlaps with switching is determined, from the switching frequency of the switching regulator, the cycle of the horizontal scanning signal and the like, and only the row with respect to which readout thereof overlaps with switching is corrected. Moreover, the switching frequency at this time may be calculated from the switching pulse detected by a pulse detection unit.

Second Embodiment

A second embodiment of the present invention will be described below. In this second embodiment, the configuration of an image capturing apparatus is similar to that of the first embodiment described with reference to FIG. 1, and thus description of constituent elements similar to those of the first embodiment is omitted, and only different constituent elements will be described. Note that, in the second embodiment, a power supply circuit is different from that of the first embodiment, and thus the power supply circuit 111 in the first embodiment is denoted as power supply circuit 111A.

Figure 13:
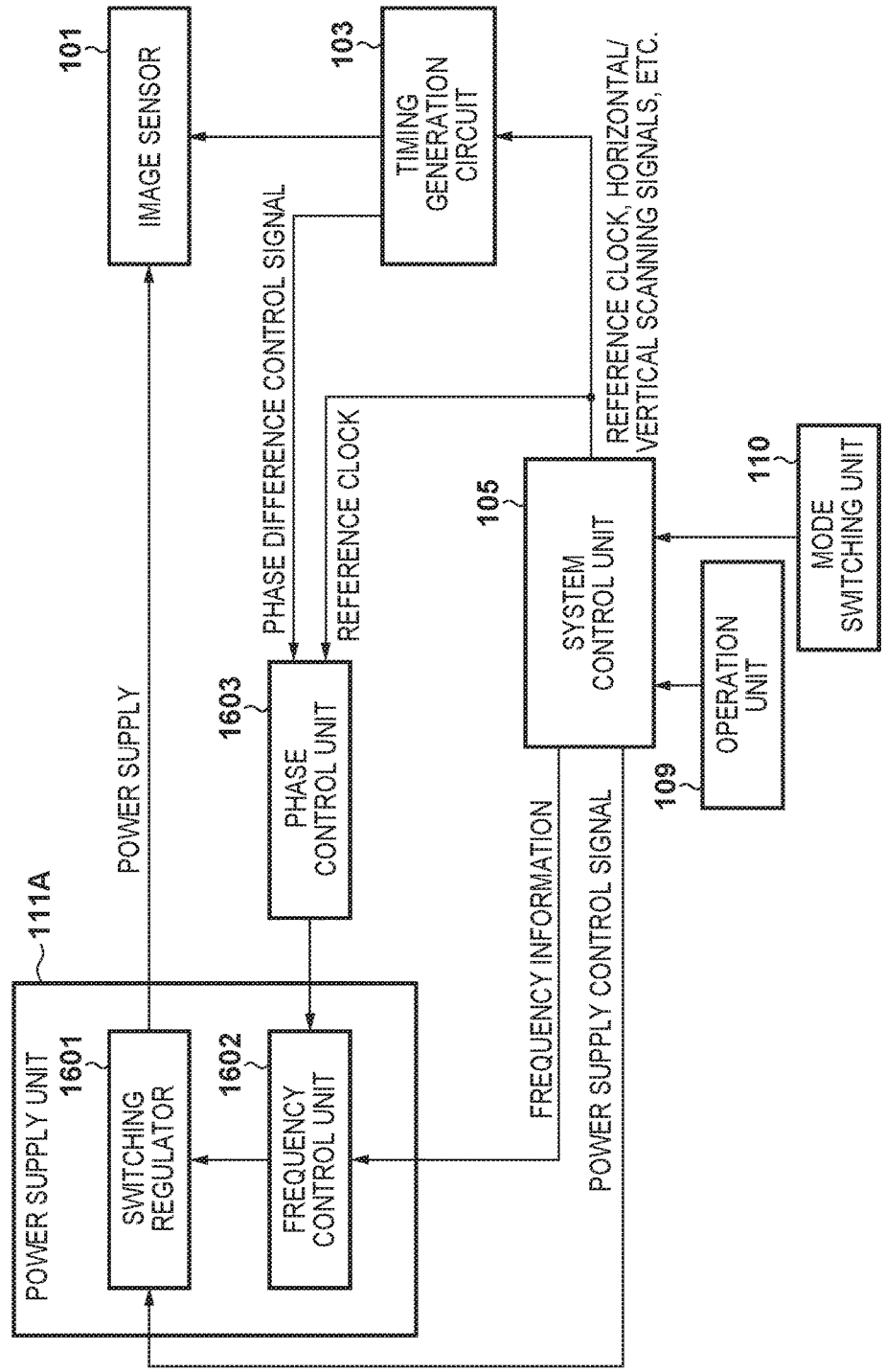
FIG. 13 is a diagram showing the configuration of a portion of an image capturing apparatus of a second embodiment.

FIG. 13 is a schematic diagram showing a portion of the configuration of the power supply unit and the image capturing apparatus in the second embodiment. In FIG. 13, the power supply circuit 111A is constituted to include a switching regulator 1601 for converting an input voltage into an output voltage of a different value under control of a switching element and a frequency control unit 1602, and output from the power supply circuit 111A is supplied to as image sensor 101 and the like.

Figure 16:
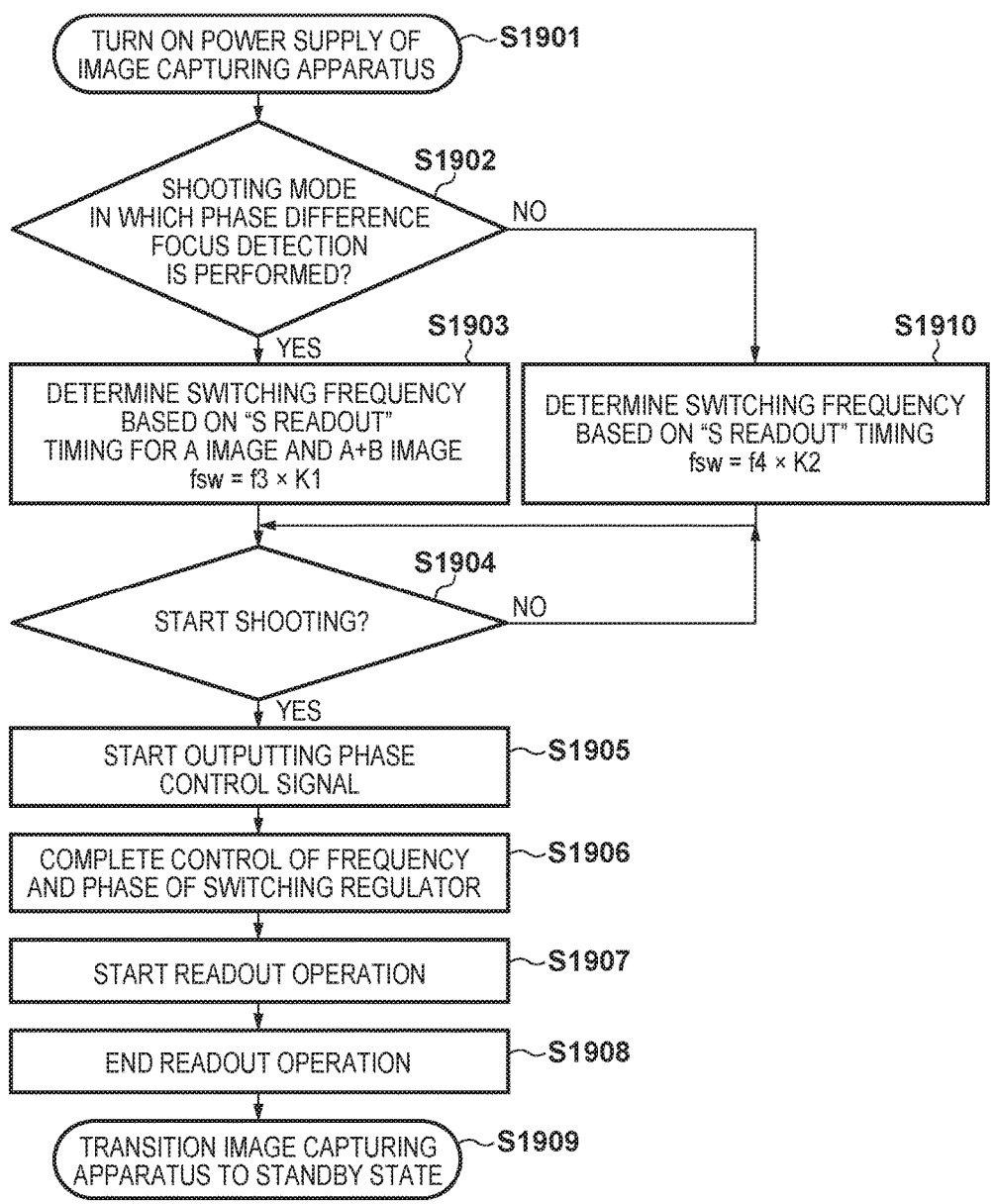
FIG. 16 is a flowchart showing an operation of the image capturing apparatus of the second embodiment.

FIG. 16 is a flowchart showing an image capturing operation in this embodiment. A series of flows of the image capturing operation of this embodiment will be described with reference to FIGS. 13 and 16.

After the image capturing apparatus is activated using a power switch in step S1901, a standby state is entered in which power is not supplied to constituent elements of an image capturing system such as the image sensor 101, until when the procedure transitions to a shooting operation. In step S1902, the user can select a shooting mode such as still image shooting, moving image shooting or live view shooting, using a mode switching unit 110. If the selected shooting mode is a moving image shooting mode or a live view shooting mode in which phase difference focus detection is performed, the procedure advances to step S1903, and otherwise, the procedure advances to step S1920.

In step S1903, a system control unit 105 sends, to the frequency control unit 1602, frequency information determined based on an image capturing readout cycle at the time of moving image shooting or live view shooting in which phase difference focus detection is performed. The frequency control unit 1602 then sets an output frequency so as to be a multiplication frequency of the image capturing readout cycle based on this frequency information.

Here, a switching frequency that is synchronized with an image capturing readout timing signal is denoted by fsw. A sampling cycle Δt1 from an "N readout" timing until a "S_A readout" timing and a frequency obtained from the reciprocal of the sampling cycle Δt1 are indicated by f1. In addition, a sampling cycle Δt2 from an "N readout" timing until an "S_A+B readout" timing and a frequency obtained from the reciprocal of the sampling cycle Δt2 are indicated by f2. A switching frequency fsw is set to a value that satisfies Expression 4 below in which the least common multiple of the frequencies f1 and f2 is indicated by a frequency f3, and an integer by which a switching frequency at which a power supply IC can be driven is multiplied is indicated by K1.

$$fsw = f3 \times K1 \qquad 4$$

f1=1/Δt1
f2=1/Δt2
f3: the least common multiple of f1 and f2
K1: an integer by which a switching frequency at which the power supply IC can be driven is multiplied If the switching frequency fsw satisfies Expression 4, the switching phases of "S_A readout" and "S_A+B readout" are the same, with "N readout" serving as a reference. Therefore, at the time of "N readout" and "S_A readout", the difference amount of noise at the time of "N readout" and "S_A+B readout" is uniformized for each row, and it becomes possible to improve the accuracy of readout signals, and reduce horizontal stripes in a shot image.

Sere, the frequency control unit 1602 is constituted as shown in FIG. 14 using a phase synchronization circuit (PLL) 1701, for example. A frequency divider 1702 for frequency division is arranged at the output of a phase synchronization circuit 701, and a frequency divider 1703 for multiplication is arranged at the input. By performing frequency division on a reference clock of the image capturing system at a desired frequency dividing ratio based on frequency information 606, it is possible to generate a driving frequency of the switching regulator 1601 at a multiplication frequency that is synchronized with the periods Δt1 and Δt2.

Returning to FIG. 16, in step S1904, a live view shooting operation is started by turning on a shooting start switch. In step S1905, the system control unit 105 sends the reference clock of the image capturing system to a phase control unit 1603. Subsequently, a phase control signal is output from a timing signal generation circuit 103, such that a switching timing of the switching regulator 1601 does not overlap the readout timing of the image sensor. By performing control in this manner, timing for inputting the reference clock to the frequency control unit 1602 is controlled.

Here, the phase control unit 1603 is configured as shown in FIG. 15 using an AND logic circuit 801, for example. Timing of input to the frequency control unit 1602 can be controlled by receiving the phase control signal from the timing generation circuit 103 at a desired timing, and outputting the reference clock when AND with the reference clock is satisfied.

In addition, the system control unit 105 sends, to the timing generation circuit 103, the reference clock of the image capturing system and image capturing system control signals such as a horizontal scanning signal and a vertical scanning signal, making it possible for the image sensor to read out an image.

In step S1906, at the timing at which the phase control signal was input, the switching regulator 1601 starts driving at a multiplication frequency that is set to the least common multiple of an S_A−N frequency that is the reciprocal of an S_A−N cycle converted based on the frequency information set in step S1903 and an S_A+B−N frequency that is the reciprocal of an S_A+B_−N cycle, and supplies power to the image sensor 101.

After that, in step S1907, a still image is read out, and in step S1908, readout of the entire still image ends. In step S1909, a standby state is entered in which power is not supplied to constituent elements of the image capturing system such as the image sensor 101.

On the other hand, in step S1902, if the shooting mode selected using the mode switching unit 110 is a moving image shooting mode, a live view shooting mode or a still image shooting mode in which phase difference focus detection is not performed, the procedure advances to step S1910.

In step S1910, the system control unit 105 sends, to the frequency control unit 1602, frequency information determined based on an image capturing readout cycle at the time of moving image shooting, live view shooting or still image shooting in which phase difference focus detection is not performed. The frequency control unit 1602 sets an output frequency to be a multiplication frequency of the image capturing readout cycle based on this frequency information.

Here, a switching frequency that is synchronized with the image capturing readout timing signal is indicated fsw. A sampling cycle Δt4 from an "N readout" timing until an "S readout" timing and a frequency obtained from the reciprocal of the sampling cycle Δt4 are indicated by f4. The switching frequency fsw is set to a value that satisfies Expression 5 below, in which an integer by which a switching frequency at which the power supply IC can be driven is multiplied is indicated by K2.

$$fsw = f4 \times K2 \qquad 5$$

f4=1/Δt4

K2: an integer by which a switching frequency at which the power supply IC can be driven is multiplied.

If the switching frequency fsw satisfies Expression 5, the difference amount of noise between "N readout" and "S readout" is the same for each row, making it possible to reduce horizontal stripes in a shot image.

Figure 17:
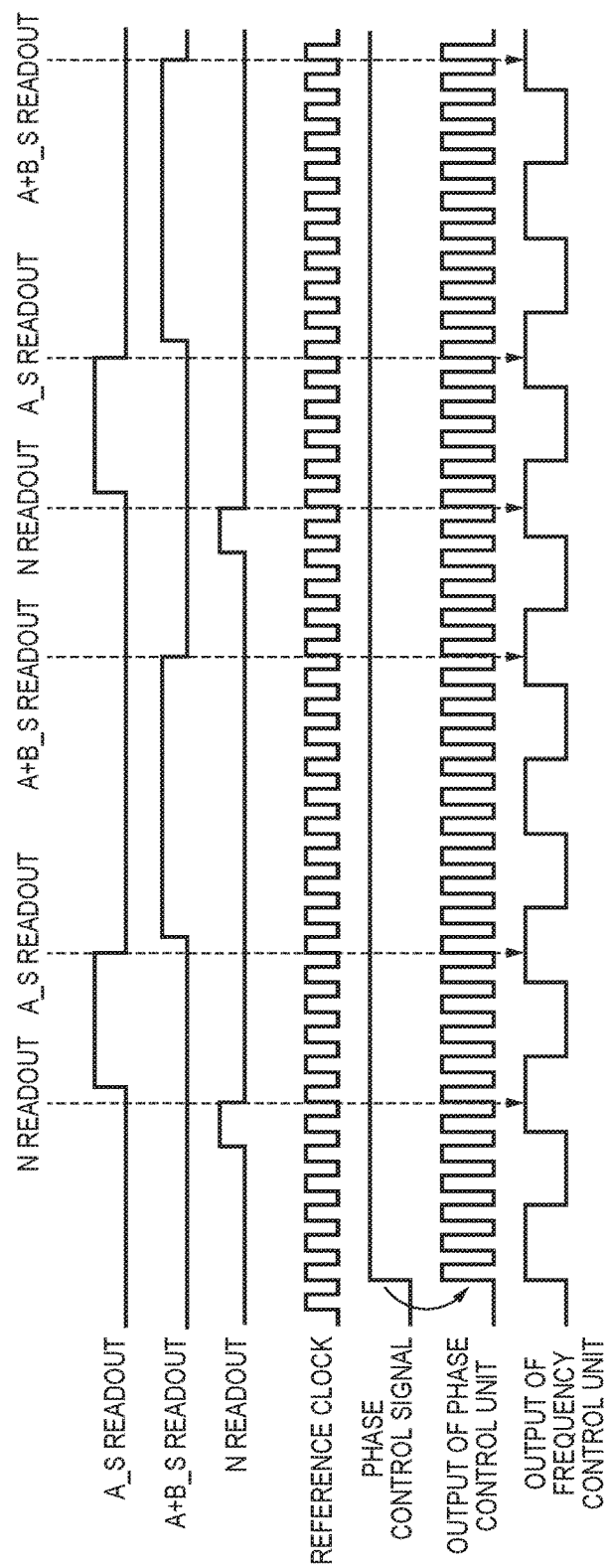
FIG. 17 is a timing chart of frequency synchronization control/phase control in the second embodiment.

FIG. 17 is a diagram showing a state in which frequency control and phase control are performed by a method of this embodiment. As shown in FIG. 17, the timing at which a phase control signal rises is controlled, and the timing at which a reference clock is input to the frequency control unit 1602 is controlled. This enables phase control such that image capturing readout control is not performed at a switching timing that is output from the frequency control unit 1602.

Figure 18:
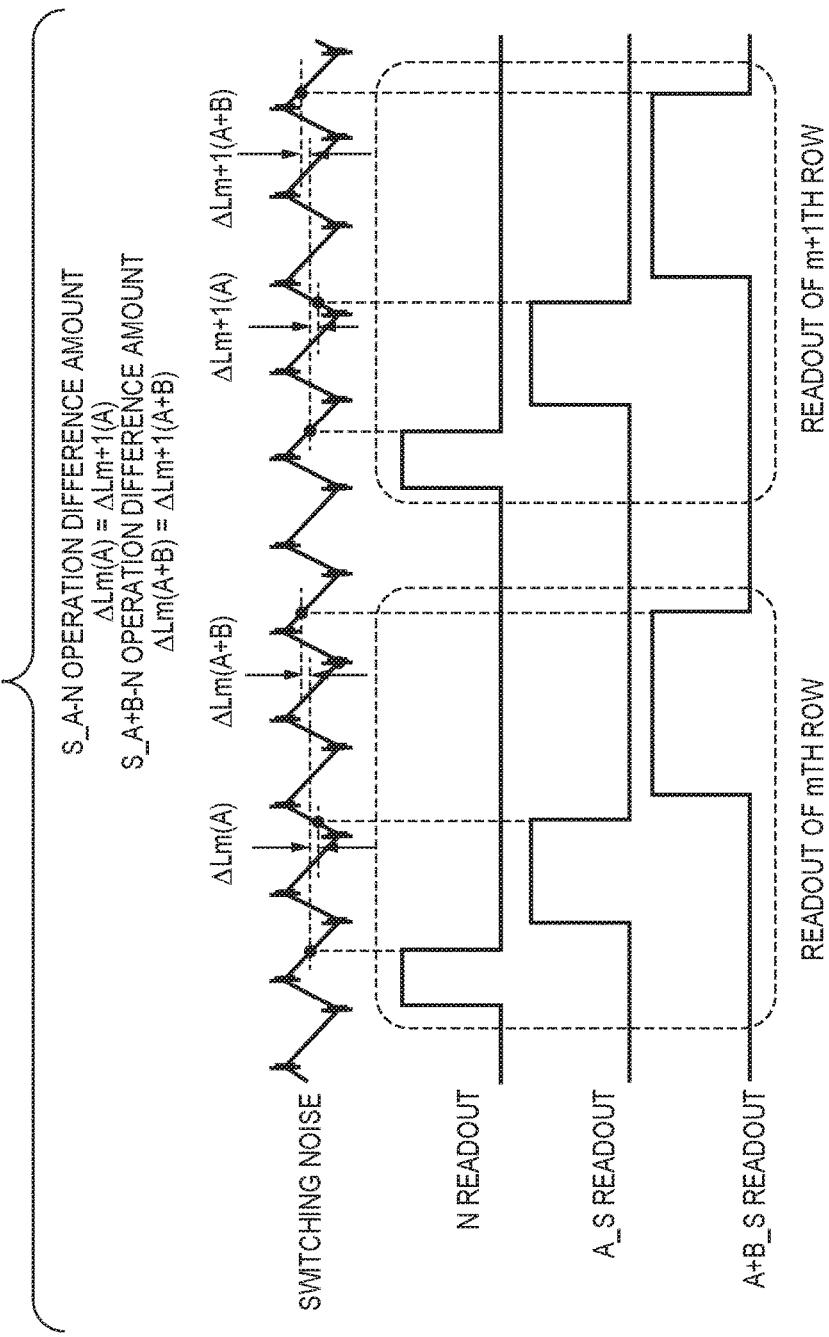
FIG. 18 is a diagram showing the phase relationship between readout timing and switching timing of a switching regulator in the second embodiment.

FIG. 18 is a schematic diagram showing the effect of eliminating the difference amount of potential levels different for each row when an S_A−N operation and an S_A+B−N operation were performed, by controlling the driving frequency and the phase of the switching regulator 1601. It can be seen that potential levels at the time of "S_A readout" and "S_A+B readout" are uniformized for all the rows with "N readout" serving as a reference, by controlling the frequency. Also, it can be seen that switching timings can be changed such that switching timings of the switching regulator 1601 do not overlap readout of the image sensor 101, by performing phase control.

As described above, in this embodiment, the driving frequency and the phase of the switching regulator are controlled according to an operation of the image sensor. This makes it possible to eliminate the difference amount of potential levels at the time of "the S_A−N operation" and "the S_A+B−N operation" for each row. As a result, it is possible to suppress the influence of noise caused by the switching regulator on a shot image, improve the accuracy of readout signals, and reduce horizontal-striped noise that appears in the shot image.

Third Embodiment

Next, a third embodiment of the present invention will be described. In the third embodiment, a method for preventing a switching timing of a power supply IC from overlapping "S_A readout" and "S_A+B readout" if setting that satisfies fsw calculated by Expression 4 cannot be performed due to the restriction of the driving frequency of the power supply IC will be described. Note that the configuration of an image capturing apparatus is similar to that of the second embodiment.

Figure 19:
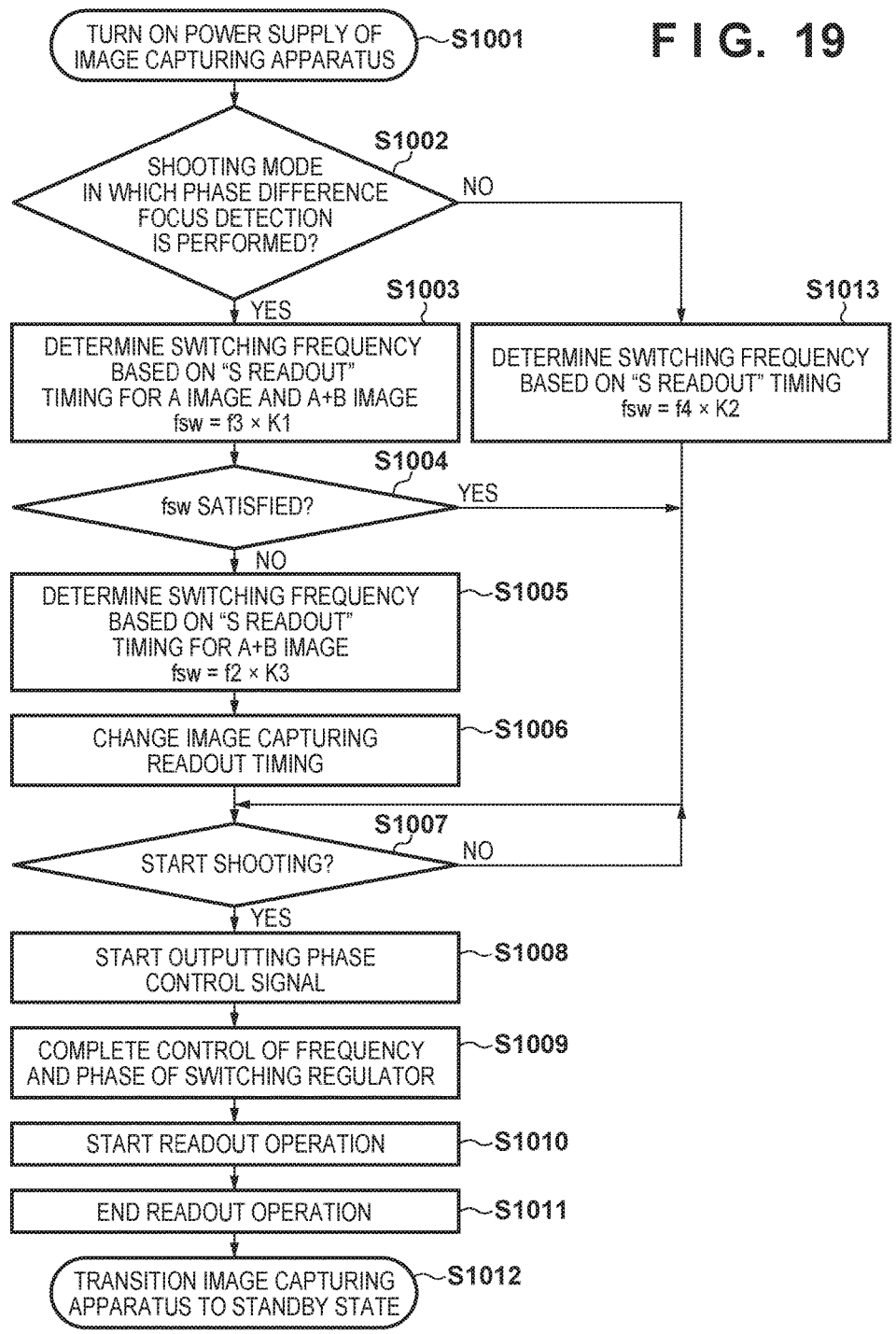
FIG. 19 is a flowchart showing an operation of an image capturing apparatus of a third embodiment.
Figure 22:
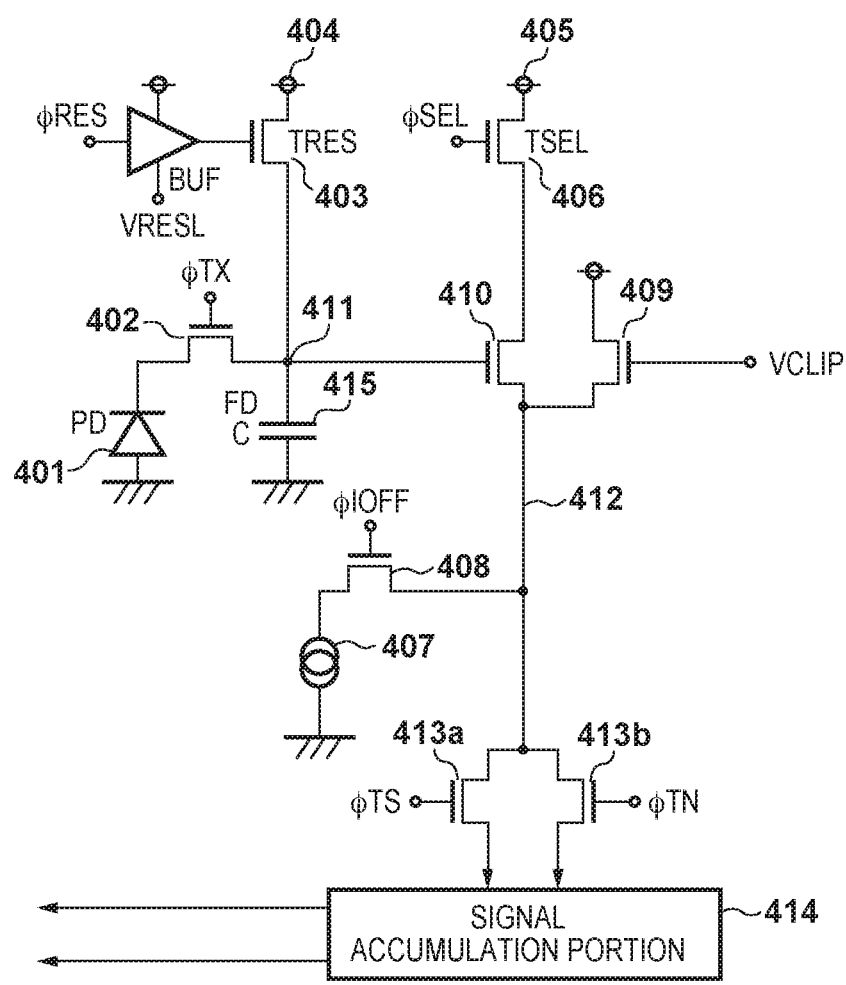
FIG. 22 is a diagram showing an equivalent circuit of an image sensor.
Figure 23:
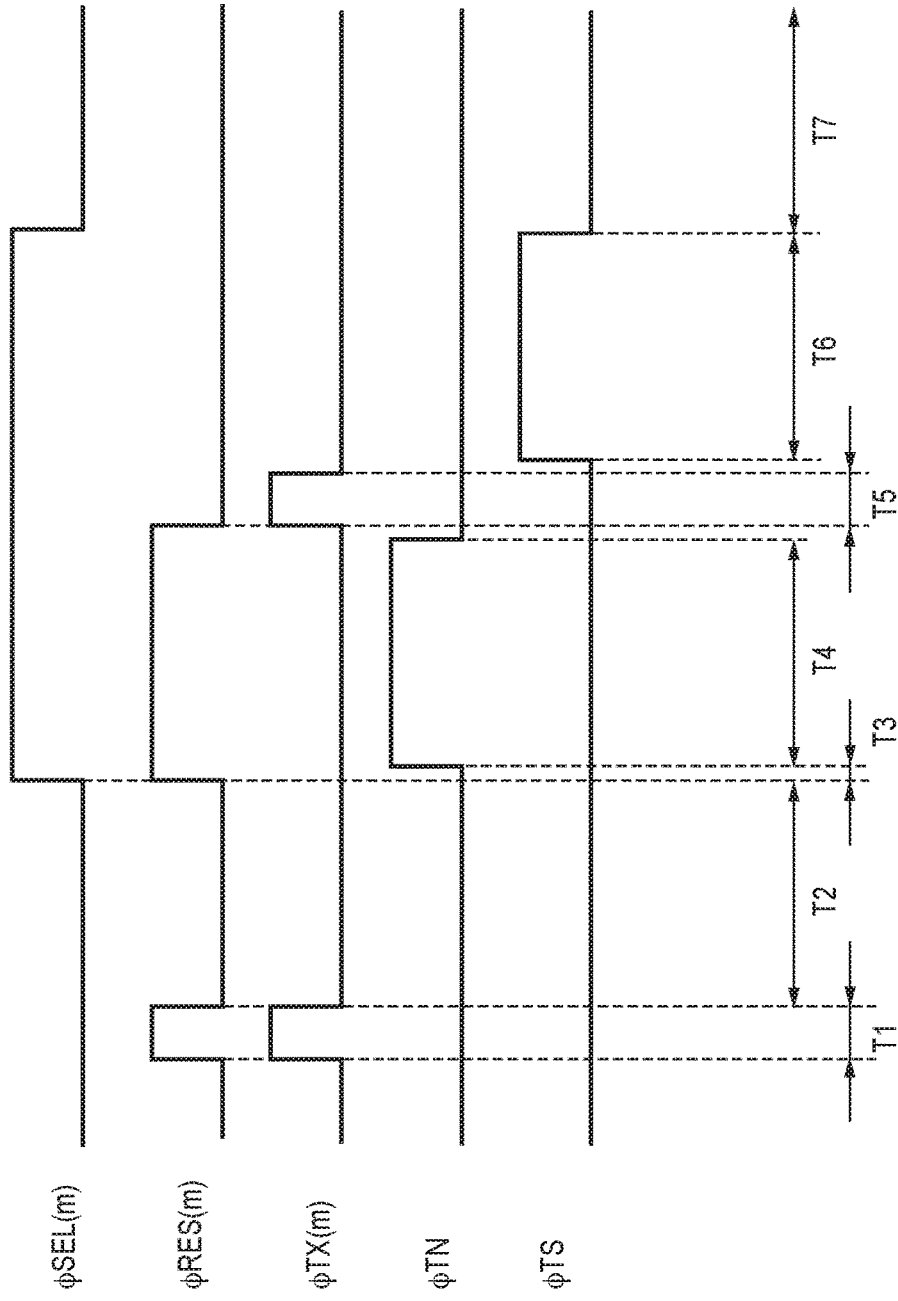
FIG. 23 is an operation timing chart of the image sensor.
Figure 24:
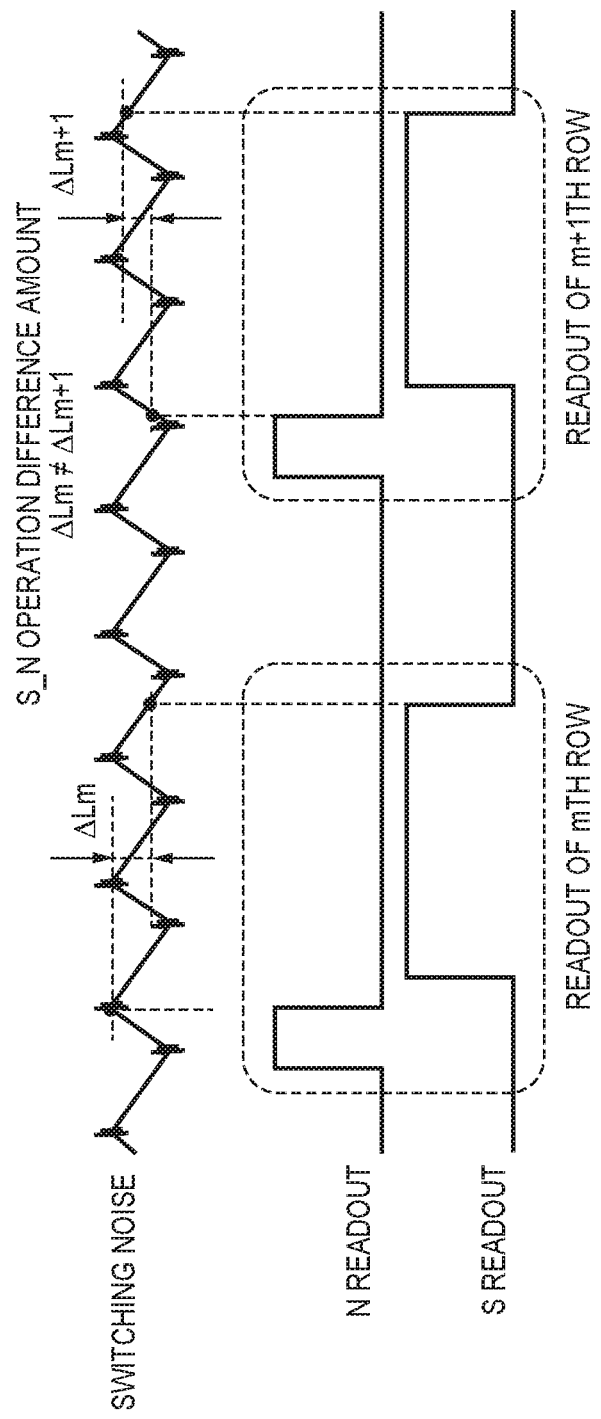
FIG. 24 is a diagram showing the phase relationship between conventional readout timing and switching timing of a switching regulator.

FIG. 19 is a flowchart showing an image capturing operation in the third embodiment.

After the image capturing apparatus is activated using a power switch in step S1001, a standby state is entered in which power is not supplied to constituent elements of the image capturing system such as an image sensor 101, until when the procedure transitions to the shooting operation in step S1002, the user can select a shooting mode such as still image shooting, moving image shooting and live view shooting using a mode switching unit 110. If the selected shooting mode is a moving image shooting mode or a live view shooting mode in which phase difference focus detection is performed, the procedure advances to step S1003, and otherwise, the procedure advances to step S1013.

In step S1003, a system control unit 105 sends, to a frequency control unit 1602, frequency information determined based on an image capturing readout cycle at the time of moving image shooting or live view shooting in which phase difference focus detection is performed. Subsequently, the frequency control unit 1602 performs setting such that an output frequency is a multiplication frequency of the image capturing readout cycle using Expression 4 described in the second embodiment, based on this frequency information.

In step S1004, the system control unit 105 determines whether or not the switching frequency fsw can be set to a value that satisfies Expression 4. If the switching frequency fsw can be set to a value that satisfies Expression 4, the switching frequency fsw is set to that value, and the procedure advances to step S1007. If the switching frequency fsw cannot be set to a value that satisfies Expression 4 due to the restriction of the driving frequency at which the power supply IC can be driven or the like, the procedure advances to step S1005.

As shown in FIG. 20A, if the switching frequency fsw cannot be set to a value that satisfies Expression 4, and an "S_A readout" timing overlaps a switching timing of the power supply IC, the following processing is performed in step S1005. The switching frequency fsw that satisfies Expression 6 is set based on a frequency f2 that is the reciprocal of a sampling cycle Δt2 from an "N readout" timing until an "S_A+B readout" timing.

$$fsw = f2 \times K3 \qquad 6$$

f2=1/Δt2

K3: an integer by which a switching frequency at which the power supply IC can be driven is multiplied In step S1006, an "S_A readout" timing is prevented from overlapping a switching timing of the power supply IC that has transitional power supply variation, based on the phase of the switching frequency fsw that has been set. The system control unit 105 changes the "S_A readout" timing by to as in FIG. 20B such that the "S_A readout" timing has the same phase as "N readout" and "S_A_A+B readout".

It can be seen that, even if the switching frequency fsw of the power supply IC does not satisfy Expression 4 above, potential levels at the time of "S_A readout" and "S_A+B readout" are the same for all the rows with "N readout" serving as a reference, by changing the timing of "S_A readout". In step S1007, a live view shooting operation is started by turning on a shooting start switch.

Operations from steps S1008 to S1013 are similar to the operations from steps S1905 to S1909 in FIG. 16, and thus description thereof is omitted.

As described above, even if the switching frequency fsw calculated by Expression 4 of the second embodiment cannot be satisfied, and "S_A readout" overlaps a switching timing of the power supply IC, the difference amount of potential levels at the time of "an S_A−N operation" and "an S_A+B_−N operation" can be eliminated for each row by changing the timing of "S_A readout". As a result, it is possible to suppress the influence of noise caused by the switching regulator on a shot image, improve the accuracy of readout signals, and reduce horizontal-striped noise that appears in the shot image.

The preferred embodiments of the present invention have been described above, but the present invention is not limited to these embodiments, and various changes and modifications can be made within the scope of the invention.

Other Embodiments

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment(s). The computer may comprise one or more processors (e.g., central processing unit (CPU), micro processing unit (MPU))) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-148993, filed Jul. 28, 2016, which is hereby incorporated by reference herein in its entirety.

What is claimed is:

1. An image capturing apparatus comprising:
   an image sensor in which unit pixels each having a plurality of photoelectric conversion portions are arranged in matrix;
   a readout unit that performs a first readout operation of reading out signals of a portion of the plurality of photoelectric conversion portions of the unit pixel and a second readout operation of reading out signals of a greater number of the plurality of photoelectric conversion portions of the unit pixel than the first readout operation;
   a switching regulator that drives the readout unit; and
   a frequency controller that controls a switching frequency of the switching regulator,
   wherein the frequency controller controls a switching frequency of the switching regulator such that a phase of the switching frequency satisfies a predetermined relationship, with respect to a timing for reading out noise signals from the plurality of photoelectric conversion portions using the readout unit, a timing for reading out signals from the plurality of photoelectric conversion portions by the first readout operation, and a timing for reading out signals from the plurality of photoelectric conversion portions by the second readout operation.

2. The image capturing apparatus according to claim 1, wherein the frequency controller sets the switching frequency to a first frequency for a first period that is a period from the timing for reading out the noise signals to the timing for reading out signals by the first readout operation, and sets the switching frequency to a second frequency for a second period that is a period from the timing for reading out signals by the first readout operation to the timing for reading out signals by the second readout operation.

3. The image capturing apparatus according to claim 2, wherein the first frequency and the second frequency are different.

4. The image capturing apparatus according to claim 2, wherein the frequency controller sets the first frequency to a value that is a multiple of a reciprocal of the first period, and sets the second frequency to a value that is a multiple of a reciprocal of the second period.

5. The image capturing apparatus according to claim 1, wherein the readout unit reads out a signal of at least one of the plurality of photoelectric conversion portions by the first readout operation, and reads out signals of all of the plurality of photoelectric conversion portions by the second readout operation.

6. The image capturing apparatus according to claim 1, wherein the readout unit reads out a signal of at least one of the plurality of photoelectric conversion portions by the first readout operation, and reads out, by the second readout operation, signals of the photoelectric conversion portions other than the photoelectric conversion portion whose signal has been read out by the first readout operation, out of the plurality of photoelectric conversion portions.

7. The image capturing apparatus according to claim 1, wherein the frequency controller sets the switching frequency based on a cycle for reading out an image signal from the image sensor.

8. The image capturing apparatus according to claim 1, wherein the frequency controller has:
   a detection unit that detects a switching timing of the switching regulator; and
   a correction unit that corrects a switching timing of the switching regulator such that switching is not performed at the timing for reading out noise signals, the timing for reading out signals by the first readout operation, and the timing for reading out signals by the second readout operation, based on information detected by the detection unit.

9. The image capturing apparatus according to claim 8, wherein the correction unit corrects a phase of a switching pulse of whichever of the first frequency and the second frequency is the frequency at which the switching regulator is not driven.

10. The image capturing apparatus according to claim 1, further comprising:
a setting unit that sets a plurality of shooting modes,
wherein the frequency controller controls the switching frequency according to a shooting mode set by the setting unit.

11. The image capturing apparatus according to claim 1, wherein the frequency controller sets the switching frequency so as to be a multiple of a least common multiple of a reciprocal of a first period that is a period from the timing for reading out noise signals to the timing for reading out signals by the first, readout operation and a reciprocal of a second period that is a period from the timing for reading out signals by the first readout operation to the timing for reading out signals by the second readout operation.

12. A control method for an image capturing apparatus that has an image sensor in which unit pixels each having a plurality of photoelectric conversion portions are arranged in matrix, a readout unit that performs a first readout operation of reading out signals of a portion of the plurality of photoelectric conversion portions of the unit pixel and a second readout operation of reading out signals of a greater number of the plurality of photoelectric conversion portions of the unit pixel than the first readout operation, and a switching regulator that drives the readout unit, the method comprising:
performing frequency control for controlling a switching frequency of the switching regulator,
wherein in the frequency control, a switching frequency of the switching regulator is controlled such that a phase of the switching frequency satisfies a predetermined relationship, with respect to a timing for reading out noise signals from the plurality of photoelectric conversion portions using the readout unit, a timing for reading out signals from the plurality of photoelectric conversion portions by the first readout operation, and a timing for reading cut signals from the plurality of photoelectric conversion portions by the second readout operation.

13. A non-transitory computer-readable storage medium that stores a program for causing a computer to execute steps of a control method for an image capturing apparatus that has an image sensor in which unit pixels each having a plurality of photoelectric conversion portions are arranged in matrix,
a readout unit that performs a first readout operation of reading out signals of a portion of the plurality of photoelectric conversion portions of the unit pixel and a second readout operation of reading out signals of a greater number of the plurality of photoelectric conversion portions of the unit pixel than the first readout operation, and a switching regulator that drives the readout unit, the method comprising:
performing frequency control for controlling a switching frequency of the switching regulator,
wherein in the frequency control, a switching frequency of the switching regulator is controlled such that a phase of the switching frequency satisfies a predetermined relationship, with respect to a timing for reading out noise signals from the plurality of photoelectric conversion portions using the readout unit, a timing for reading out signals from the plurality of photoelectric conversion portions by the first readout operation, and a timing for reading out signals from the plurality of photoelectric conversion portions by the second readout operation.

* * * * *